(12) United States Patent
Billigmeier et al.

(10) Patent No.: US 11,663,607 B2
(45) Date of Patent: May 30, 2023

(54) MACHINE-LEARNING BASED SYSTEMS AND METHODS FOR GENERATING AN ORDERED LISTING OF OBJECTS FOR A PARTICULAR USER

(71) Applicant: Optum, Inc., Minnetonka, MN (US)

(72) Inventors: David Billigmeier, Plymouth, MN (US); Jun Li, Minnetonka, MN (US); Jason Kip Davis, Edina, MN (US)

(73) Assignee: Optum, Inc., Minnetonka, MN (US)

( * ) Notice: Subject to any disclaimer, the term of this patent is extended or adjusted under 35 U.S.C. 154(b) by 757 days.

(21) Appl. No.: 16/656,261

(22) Filed: Oct. 17, 2019

(65) Prior Publication Data

US 2021/0065203 A1    Mar. 4, 2021

Related U.S. Application Data

(60) Provisional application No. 62/895,887, filed on Sep. 4, 2019.

(51) Int. Cl.
| | |
|---|---|
| *G06Q 30/00* | (2012.01) |
| *G06Q 30/016* | (2023.01) |
| *G06N 5/04* | (2023.01) |
| *G06N 20/00* | (2019.01) |

(52) U.S. Cl.
CPC ........... *G06Q 30/016* (2013.01); *G06N 5/04* (2013.01); *G06N 20/00* (2019.01)

(58) Field of Classification Search
CPC .................................................... G06N 20/00
See application file for complete search history.

(56) References Cited

U.S. PATENT DOCUMENTS

| | | | |
|---|---|---|---|
| 10,733,619 B1* | 8/2020 | Newman | G06Q 30/0201 |
| 10,887,462 B1* | 1/2021 | Coyer | G06F 40/56 |
| 2003/0033145 A1 | 2/2003 | Petrushin | |
| 2011/0283190 A1 | 11/2011 | Poltorak | |
| 2015/0242707 A1 | 8/2015 | Wilf et al. | |

(Continued)

OTHER PUBLICATIONS

"Zendesk Announces New Self-service Experiences With Expanded AI-powered Solutions," Business Wire [New York] Jun. 12, 2019; Dialog #2238458851 2pgs. (Year: 2019).*

(Continued)

*Primary Examiner* — Robert M Pond
(74) *Attorney, Agent, or Firm* — Alston & Bird LLP

(57) ABSTRACT

Systems and methods are configured to determine customer-specific recommendations in the form of ordered listings of objects (e.g., talking points for discussion) for interacting with customers during customer-service interactions based on the effectiveness of historical customer-service interactions. One or more machine-learning customer similarity models are further configured to determine similarities between customers, such that customer-service interaction strategies utilized for a first customer may be applied to determined similar customers. Moreover, based at least in part on historical interaction data generated for previous customer-service interactions, a machine-learning recommendation model is configured to generate an ordered listing of objects (e.g., talking points for discussion) for interacting with customers, and such recommendations may be presented to a customer-service representative via a graphical user interface.

21 Claims, 15 Drawing Sheets

(56) References Cited

U.S. PATENT DOCUMENTS

| | | |
|---|---|---|
| 2015/0269142 A1* | 9/2015 | Antebi .................... G06F 40/35 |
| | | 704/9 |
| 2015/0339327 A1 | 11/2015 | Unitt et al. |
| 2016/0180726 A1* | 6/2016 | Ahuja ..................... G06N 5/022 |
| | | 434/322 |
| 2017/0169826 A1 | 6/2017 | Orthagen et al. |
| 2018/0113854 A1 | 4/2018 | Vig et al. |
| 2019/0028591 A1 | 1/2019 | Kumar et al. |
| 2019/0251165 A1* | 8/2019 | Bachrach ................ G06N 3/084 |
| 2020/0311145 A1* | 10/2020 | Li ....................... G06F 16/90332 |
| 2021/0065018 A1* | 3/2021 | Podgorny ............ G06N 3/0472 |

OTHER PUBLICATIONS

"Alterra.ai Introduces Answer Bot for Zendesk to Help Businesses Automate Customer Support," PR Newswire [New York] Feb. 21, 2019, Dialog #2184133970, 2pgs. (Year: 2019).*

* cited by examiner

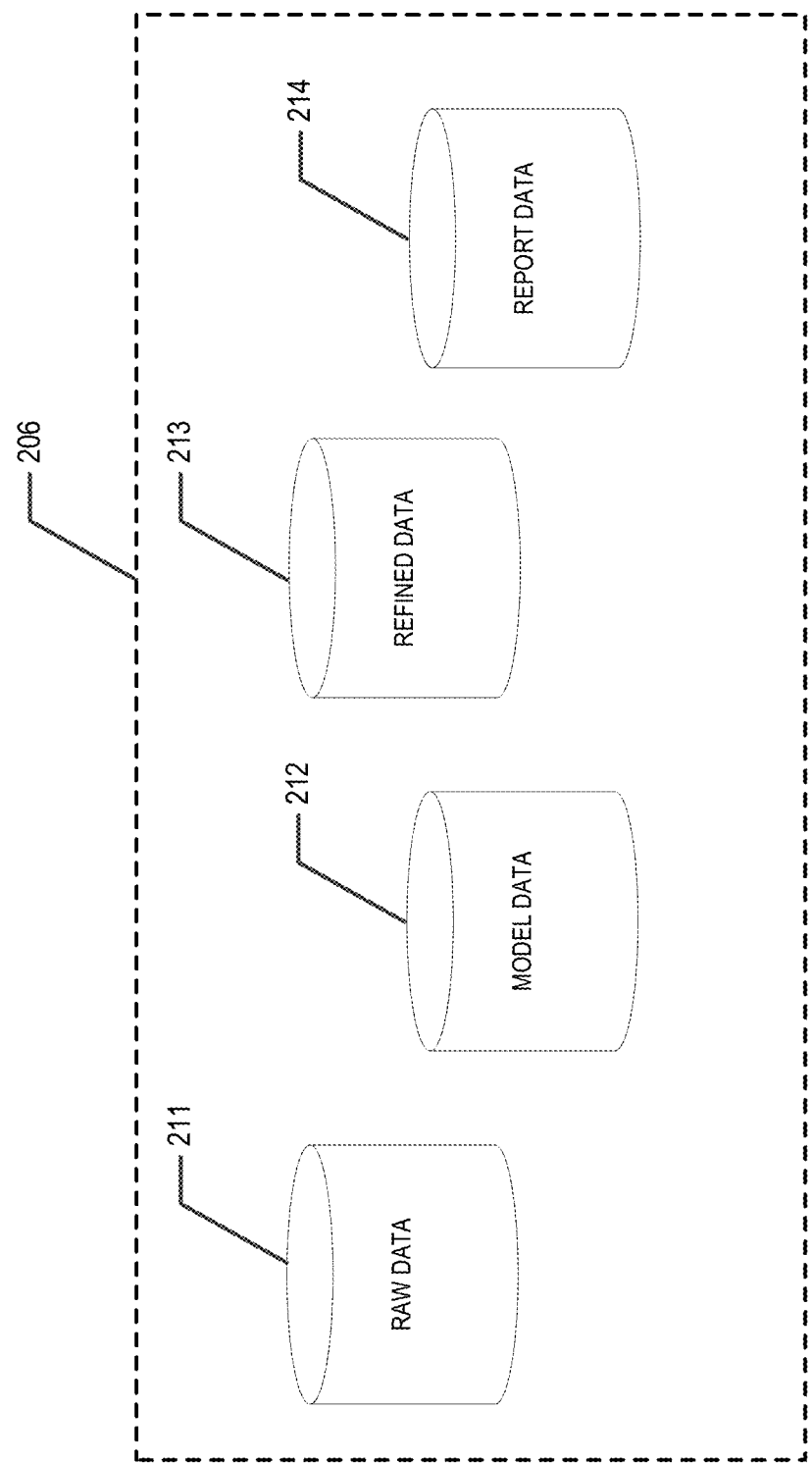

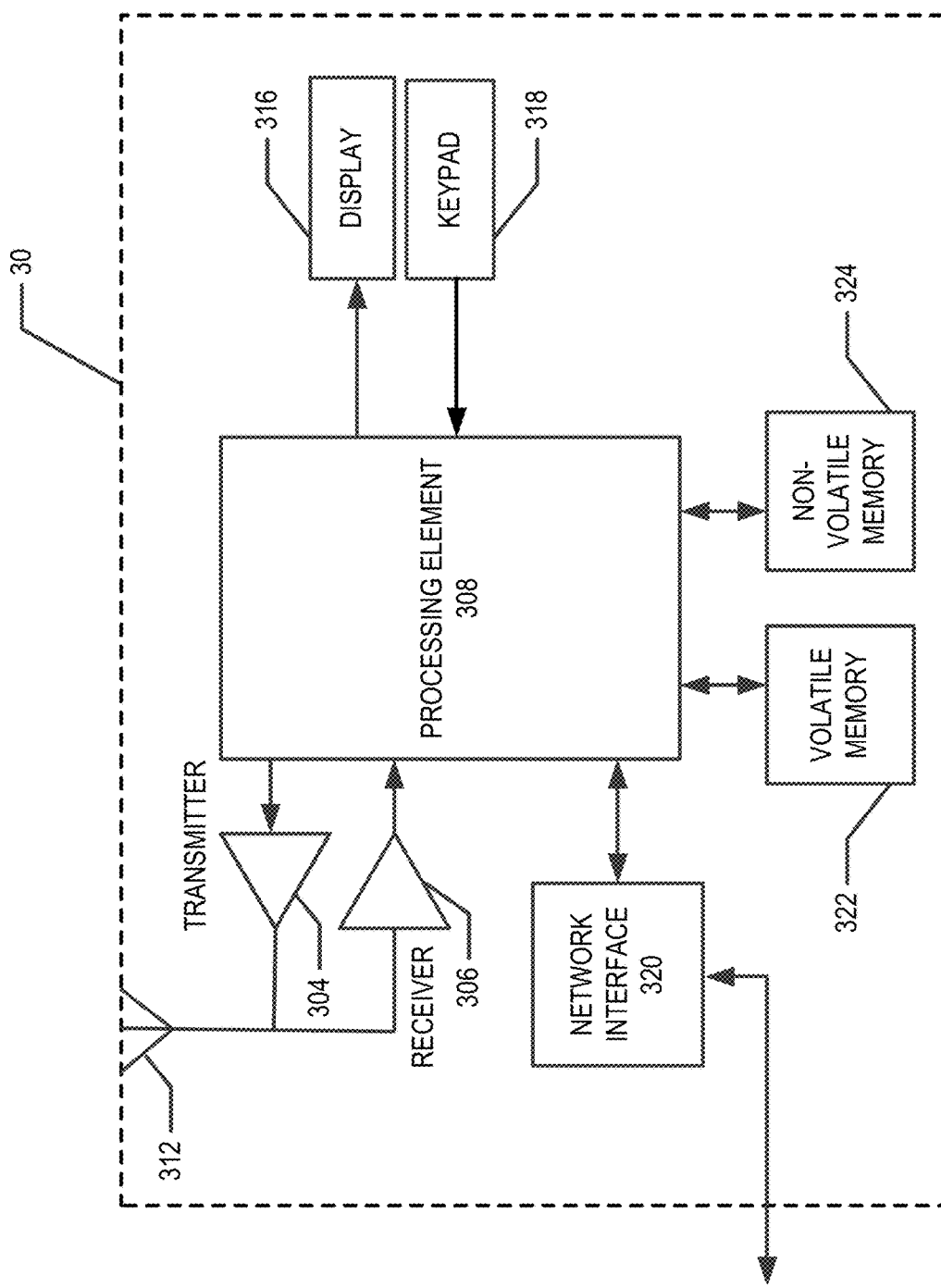

MACHINE-LEARNING BASED SYSTEMS AND METHODS FOR GENERATING AN ORDERED LISTING OF OBJECTS FOR A PARTICULAR USER

CROSS-REFERENCE TO RELATED APPLICATIONS

This patent application claims priority to U.S. Provisional Patent Appl. No. 62/895,887, filed Sep. 4, 2019, which is incorporated herein by reference in its entirety.

TECHNOLOGICAL FIELD

Embodiments of the present invention generally relate to machine-learning based systems and methods for generating a recommended order of a plurality of objects based at least in part on characteristics of a particular user.

BACKGROUND

Customer service industries strive to quickly provide individual customers/members/clients with helpful information and/or services so as to maintain high levels of customer satisfaction while quickly dispatching with customer concerns. Moreover, many customer service industries seek to provide specific customers with information regarding products/services/information that is most relevant to those customers, so as to maximize the likelihood that a particular customer will seek additional information (and potentially purchase) products and/or services suggested by customer service representatives.

Particularly due to the high volume of customer service interactions that customer service representatives engage during a given business day, there has not been a historical solution for determining a best method for discussing products/services/information with particular customers, and therefore customer service representatives have historically relied on a generalized listing of potential topics to discuss with potential customers/clients. However, though applied effort and ingenuity, the inventors have determined innovations for addressing the deficiencies of existing customer service systems.

BRIEF SUMMARY

In general, embodiments of the present invention provide methods, apparatus, systems, computing devices, computing entities, and/or the like. In accordance with one embodiment, a computer-implemented method for generating an ordered listing of talking points for a customer-service interaction is provided. In various embodiments, the method comprises: storing, in a non-transitory memory, talking point data identifying a plurality of topical keywords each associated with a talking point identified via an interaction analysis performed for a plurality of historical customer-service interactions; receiving, via a processor and as a part of a customer-service interaction initiated by a customer and between the customer and a customer-service representative, customer identifying data uniquely identifying the customer; receiving, at the processor and based at least in part on the customer identifying data, supplemental data corresponding to the customer; identifying, via the processor executing a customer-similarity model and based at least in part on the supplemental data corresponding to the customer, recommendation model parameters applicable to the customer, wherein the recommendation model parameters are generated for a particular customer cluster generated by the customer-similarity model and wherein the particular customer cluster comprises the customer; and generating, via the processor executing a recommendation model comprising the recommendation model parameters applicable to the customer, an ordered listing of talking points comprising a plurality of topical keywords selected from the talking point data; and providing at least a portion of the ordered listing of talking points for display to the customer-service representative via a graphical user interface.

In various embodiments, identifying recommendation model parameters comprises identifying a recommendation model generated for the particular customer cluster. Moreover, at least a portion of the supplemental data may be specific to the customer-service interaction. In certain embodiments, identifying recommendation model parameters comprises: executing the customer-similarity model based at least in part on supplemental data associated with a plurality of customers to generate a plurality of customer clusters, wherein each customer cluster of the plurality of customer clusters comprises a plurality of customers determined to be similar based at least in part on the customer-similarity model, and wherein the plurality of customer clusters comprises the particular customer cluster; and training a recommendation model corresponding to the particular customer cluster to generate the recommendation model parameters based at least in part on interaction data comprising data indicative of results of historical customer-service interactions with customers associated with the particular customer cluster. In certain embodiments, the interaction data for each historical customer-service interaction comprises data identifying keywords mentioned during the historical customer-service interaction and timestamps associated with each keyword mentioned during the historical customer-service interaction. In various embodiments, the keywords mentioned during the historical customer-service interaction comprise topical keywords and reactive keywords each indicative of a customer's reaction.

In various embodiments, the method further comprises: generating, during the customer-service interaction initiated by the customer, additional supplemental data corresponding to the customer; identifying, via the processor executing the customer-similarity model, updated recommendation model parameters applicable to the customer based at least in part on the additional supplemental data; and generating, via the processor executing a recommendation model comprising the updated recommendation model parameters applicable to the customer, an updated ordered listing of talking points comprising a plurality of topical keywords selected from the talking point data.

Various embodiments are directed to a computing system comprising a non-transitory computer readable storage medium and one or more processors, the computing system configured to: store, in the non-transitory computer readable storage medium, talking point data identifying a plurality of topical keywords each associated with a talking point identified via an interaction analysis performed for a plurality of historical customer-service interactions; receive, via the one or more processors as a part of a customer-service interaction initiated by a customer and between the customer and a customer-service representative, customer identifying data uniquely identifying the customer; receive, at the one or more processors and based at least in part on the customer identifying data, supplemental data corresponding to the customer; identify, via the one or more processors executing a customer-similarity model, recommendation model parameters applicable to the customer, wherein the recommendation model parameters are generated for a particular customer cluster generated by the customer-similarity model and wherein the particular customer cluster comprises the customer; and generate, via the one or more processors executing a recommendation model comprising the recommendation model parameters applicable to the customer, an ordered listing of talking points comprising a plurality of topical keywords selected from the talking point data; and provide at least a portion of the ordered listing of talking points for display to a customer-service representative via a graphical user interface.

In certain embodiments, identifying recommendation model parameters comprises identifying a recommendation model generated for the particular customer cluster. Moreover, at least a portion of the supplemental data may be specific to the customer-service interaction. In certain embodiments, identifying recommendation model parameters comprises: executing the customer-similarity model based at least in part on supplemental data associated with a plurality of customers to generate a plurality of customer clusters, wherein each customer cluster of the plurality of customer clusters comprises a plurality of customers determined to be similar based at least in part on the customer-similarity model, and wherein the plurality of customer clusters comprises the particular customer cluster; and training a recommendation model corresponding to the particular customer cluster to generate the recommendation model parameters based at least in part on interaction data comprising data indicative of results of historical customer-service interactions with customers associated with the particular customer cluster.

In various embodiments, the interaction data for each historical customer-service interaction comprises data identifying keywords mentioned during the historical customer-service interaction and timestamps associated with each keyword mentioned during the historical customer-service interaction. In certain embodiments, the keywords mentioned during the historical customer-service interaction comprise topical keywords and reactive keywords each indicative of a customer's reaction. In various embodiments, the computing system is further configured to: generate, during the customer-service interaction initiated by the customer, additional supplemental data corresponding to the customer; identify, via the one or more processors executing the customer-similarity model, updated recommendation model parameters applicable to the customer based at least in part on the additional supplemental data; and generate, via the one or more processors executing a recommendation model comprising the updated recommendation model parameters applicable to the customer, an updated ordered listing of talking points comprising a plurality of topical keywords selected from the talking point data.

Various embodiments are directed to a computer program product comprising a non-transitory computer readable medium having computer program instructions stored therein, the computer program instructions when executed by a processor, cause the processor to: store, in a non-transitory memory, talking point data identifying a plurality of topical keywords each associated with a talking point identified via an interaction analysis performed for a plurality of historical customer-service interactions; receive, as a part of a customer-service interaction initiated by a customer between the customer and a customer-service representative, customer identifying data uniquely identifying the customer; receive, based at least in part on the customer identifying data, supplemental data corresponding to the customer; identify, via execution of a customer-similarity model, recommendation model parameters applicable to the customer, wherein the recommendation model parameters are generated for a particular customer cluster generated by the customer-similarity model and wherein the particular customer cluster comprises the customer; and generate, via execution of a recommendation model comprising the recommendation model parameters applicable to the customer, an ordered listing of talking points comprising a plurality of topical keywords selected from the talking point data; and provide at least a portion of the ordered listing of talking points for display to a customer-service representative via a graphical user interface.

In certain embodiments, identifying recommendation model parameters comprises identifying a recommendation model generated for the particular customer cluster. In certain embodiments, at least a portion of the supplemental data is specific to the customer-service interaction. In various embodiments, identifying recommendation model parameters comprises: executing the customer-similarity model based at least in part on supplemental data associated with a plurality of customers to generate a plurality of customer clusters, wherein each customer cluster of the plurality of customer clusters comprises a plurality of customers determined to be similar based at least in part on the customer-similarity model, and wherein the plurality of customer clusters comprises the particular customer cluster; and training a recommendation model corresponding to the particular customer cluster to generate the recommendation model parameters based at least in part on interaction data comprising data indicative of results of historical customer-service interactions with customers associated with the particular customer cluster. In certain embodiments, the interaction data for each historical customer-service interaction comprises data identifying keywords mentioned during the historical customer-service interaction and timestamps associated with each keyword mentioned during the historical customer-service interaction. Moreover, the keywords mentioned during the historical customer-service interaction may comprise topical keywords and reactive keywords each indicative of a customer's reaction. In certain embodiments, the computer program instructions when executed by a processor, further cause the processor to: generate, during the customer-service interaction initiated by the customer, additional supplemental data corresponding to the customer; identify, via the one or more processors executing the customer-similarity model, updated recommendation model parameters applicable to the customer based at least in part on the additional supplemental data; and generate, via the one or more processors executing a recommendation model comprising the updated recommendation model parameters applicable to the customer, an updated ordered listing of talking points comprising a plurality of topical keywords selected from the talking point data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2B is a schematic representation of a memory media storing a plurality of data assets;

FIG. 3 is a schematic of a user computing entity in accordance with certain embodiments of the present invention;

Figure 7:
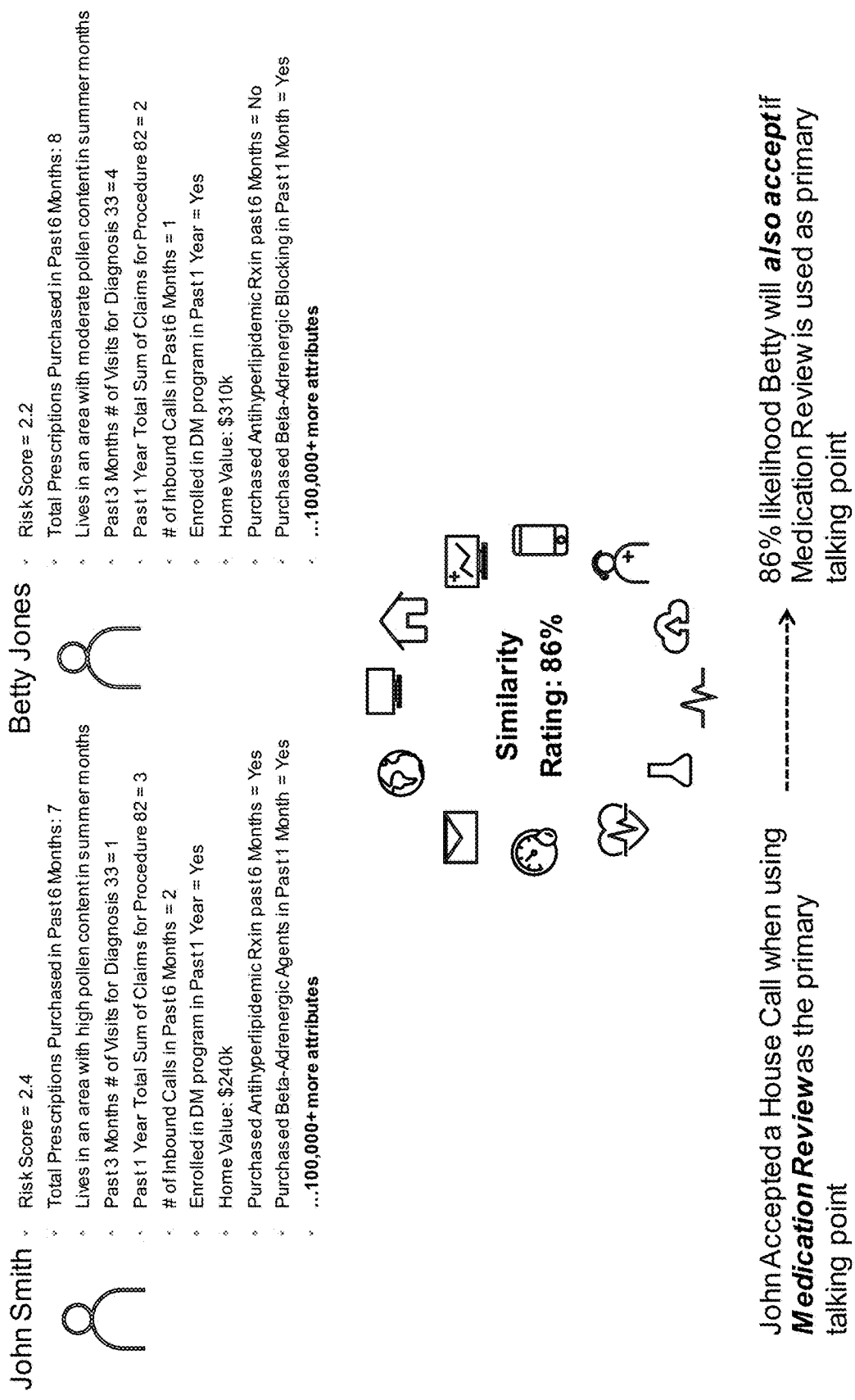
Figure 8:
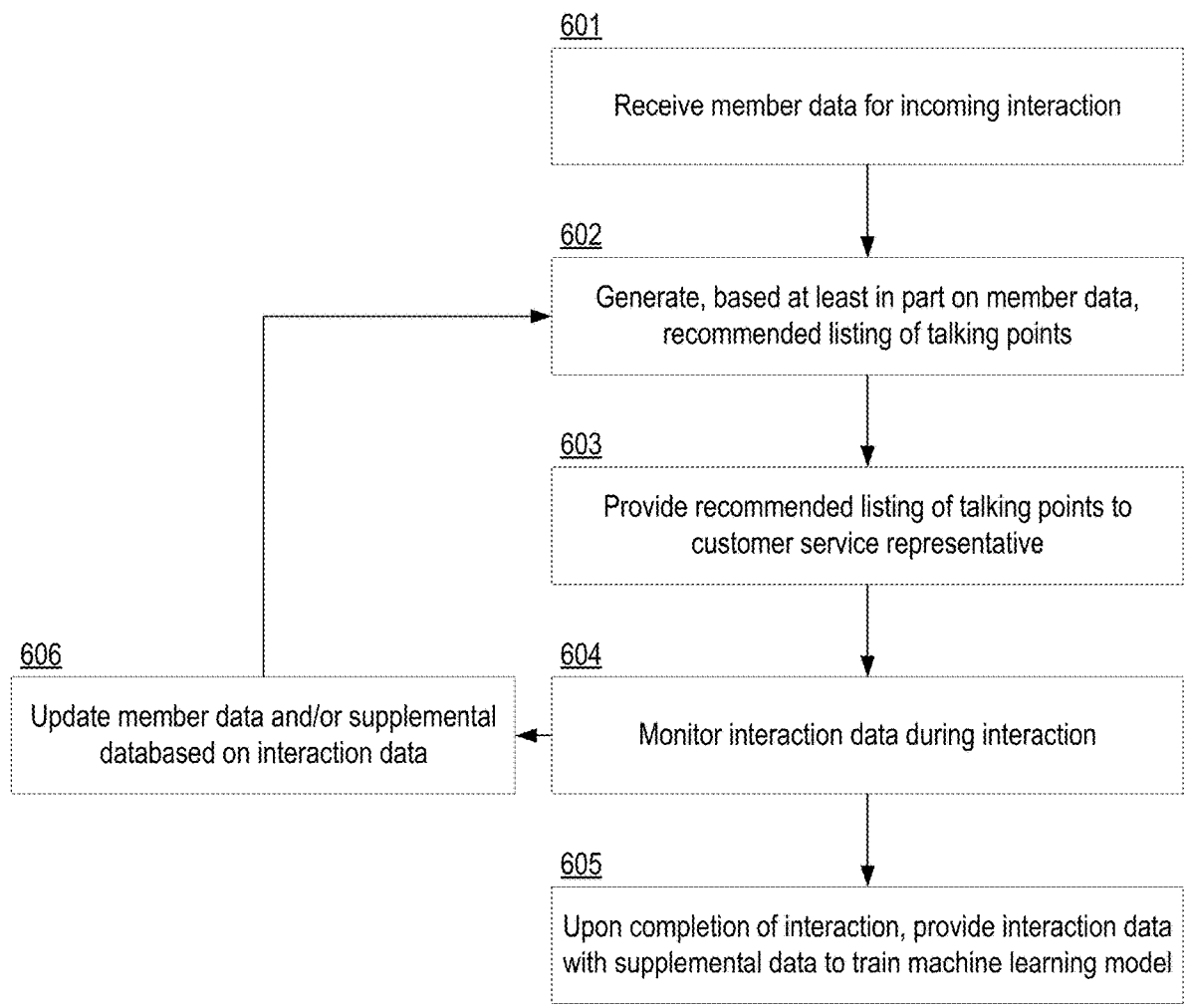

FIG. 7 graphically illustrates an analysis for determining similarities between customers;

FIG. 8 is a flowchart illustrating functionality for determining recommended strategies for engaging in a customer-service interaction with a customer; and FIGS. 9-14 illustrate example results of analyses for determining recommended strategies for engaging in a customer-service interaction with a customer.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
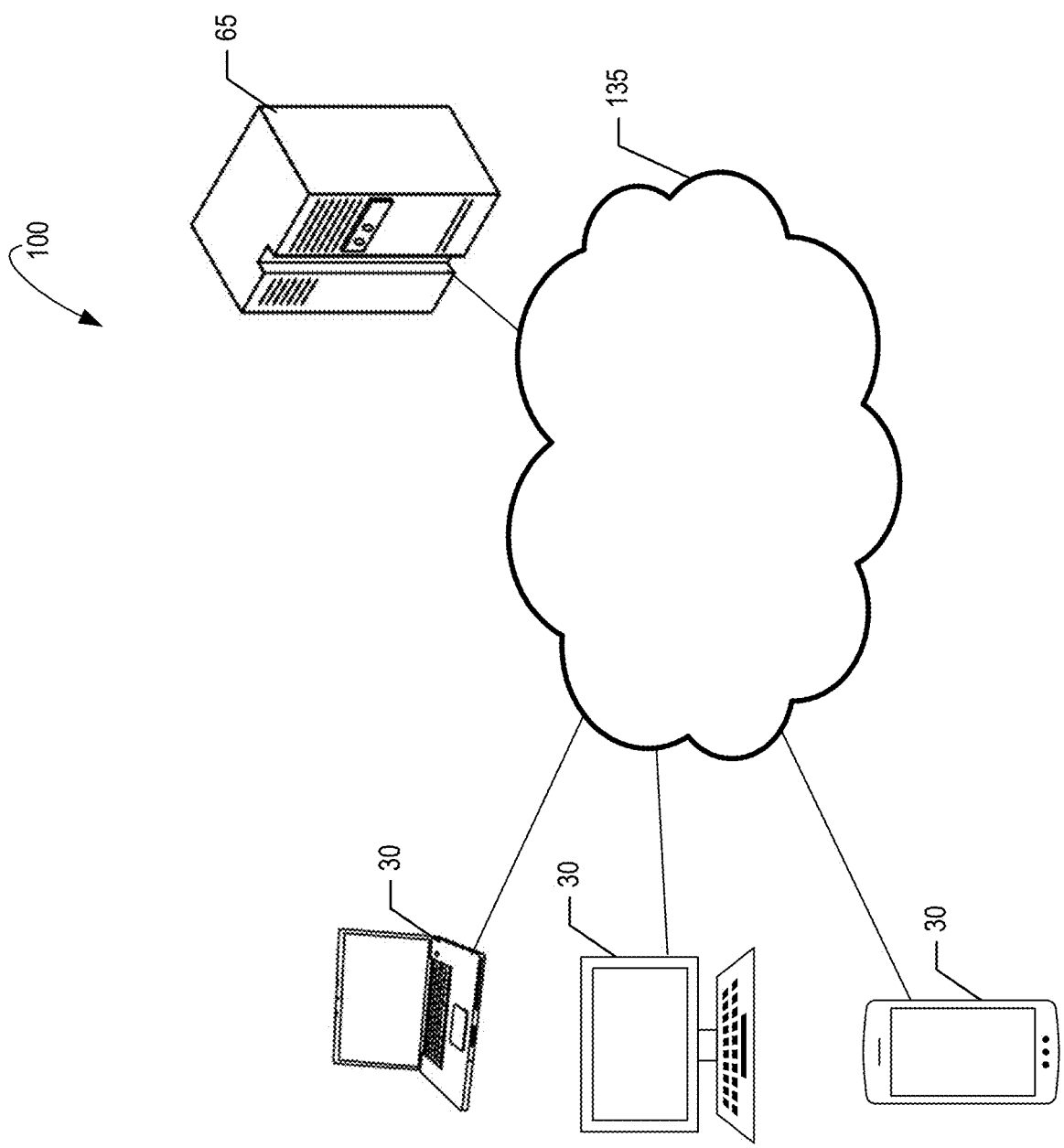
FIG. 1 is a diagram of a recommendation system that can be used in conjunction with various embodiments of the present invention.

FIG. 1 provides an illustration of a recommendation system 100 that can be used in conjunction with various embodiments of the present invention. As shown in FIG. 1, the recommendation system 100 may comprise one or more analytic computing entities 65, one or more user computing entities 30 (e.g., a user computing entity 30 associated with a provider usable to provide data to the analytic computing entity 65; and/or the like), one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Analytic Computing Entity

Figure 2A:
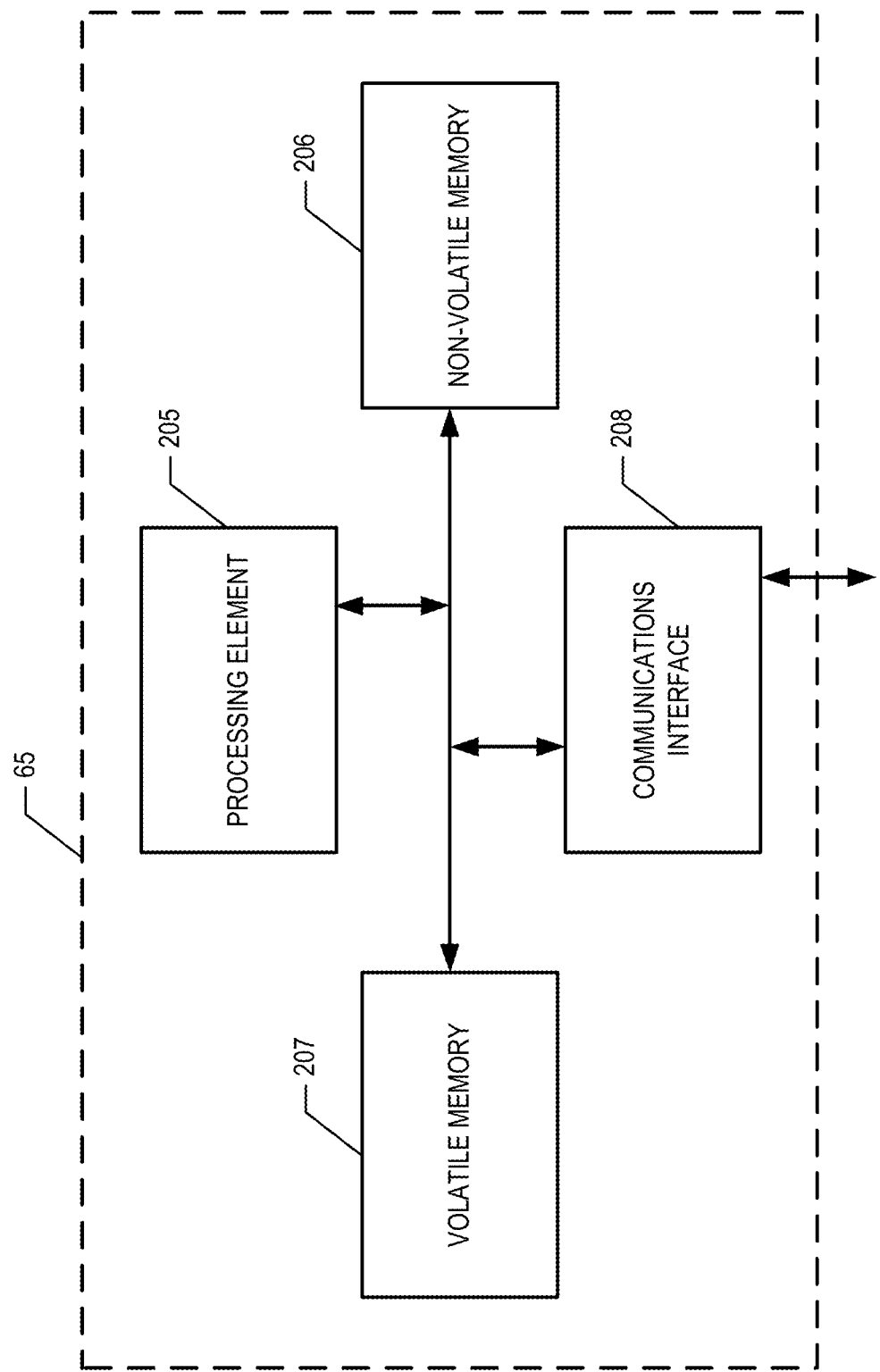
FIG. 2A is a schematic of an analytic computing entity in accordance with certain embodiments of the present invention.

FIG. 2A provides a schematic of an analytic computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, it should be understood that the analytic computing entity 65 may be embodied as a plurality of computing entities, tools, and/or the like operating collectively to perform one or more processes, methods, and/or steps. As just one non-limiting example, the analytic computing entity 65 may comprise a plurality of individual data tools, each of which may perform specified tasks and/or processes, such that collectively, the analytic computing entity 65 may be configured to execute one or more tasks requested by a user.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with other computing entities, one or more user computing entities 30, and/or the like. In certain embodiments, the analytic computing entity 65 may be configured to receive data from one or more data sources, and the analytic computing entity 65 may be configured to receive data indicative of user input, for example, from a user computing entity 30.

As shown in FIG. 2A, in one embodiment, the analytic computing entity 65 may include or be in communication with one or more processing elements 205 (also referred to as processors, processing circuitry, and/or similar terms used herein interchangeably) that communicate with other elements within the analytic computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analytic computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the oncological research system may be stored. As a person of ordinary skill in the art would recognize, the information/data required for the operation of the oncological research system may also be partially stored in the cloud data storage system and partially stored in a locally maintained data storage system.

Memory media 206 may include information/data accessed and stored by the recommendation system to facilitate the operations of the system. More specifically, memory media 206 may encompass one or more data stores configured to store information/data usable in certain embodiments. For example, as shown in FIG. 2B, data stores encompassed within the memory media 206 may comprise a topics data store 211, a customer data store 212, a model data store 213, and/or the like.

As illustrated in FIG. 2B, the data stores 206 may comprise a topics data store 211 comprising talking point data received directly from one or more data sources for storage therein. The talking point data may comprise data identifying particular topics that may be discussed with customers. These topics may be embodied as data objects each corresponding to talking point data, such as a topic identifier, a topic description, one or more keywords associated with the topic, and/or the like. In certain embodiments, the data objects embodying individual topics may be provided as database entries that may be represented in an ordered listing of talking points as a part of a recommended strategy for discussing one or more topics with customers, as discussed in greater detail herein. These topics may reflect any of a variety of topics for discussion with a customer. As just one example, in the healthcare context, a topic may be indicative of a particular benefit available to customers of a healthcare system.

Continuing with FIG. 2B, the data stores 206 may comprise a customer data store 212 comprising customer data. The customer data may comprise data specific to a particular customer which may uniquely identify the corresponding particular customer. The customer data may be provided for individual customers as within a customer profile comprising customer identifying data (e.g., a customer name, a unique customer identifier, customer contact data, and/or the like). Moreover, the customer data may comprise supplemental data indicative of various characteristics of a customer, such as current services utilized by the customer, the customer's location, and/or the like. Such characteristics may be usable to group customers so as to identify shared characteristics that may indicate that similar topic discussions may be applicable to customers having similar characteristics. It should be understood that customer data and corresponding supplemental data may be retrieved from a plurality of locations, such as user computing entities 30, external computing entities, and/or the like.

Continuing with FIG. 2B, the data stores 206 may comprise model data store 213 comprising one or more models (e.g., parameters usable by one or more machine-learning generated models) generated by the analytic computing entity 65 for determining recommended ordered listings of talking points for use with one or more customers, for determining similarities between customers, and/or the like.

In one embodiment, the analytic computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 65 with the assistance of the processing element 205 and operating system.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with computing entities or communication interfaces of other computing entities, user computing entities 30, and/or the like.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analytic computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other analytic computing entity 65 components, such as in a distributed system. Furthermore, one or more of the components may be aggregated and additional components performing functions described herein may be included in the analytic computing entity 65. Thus, the analytic computing entity 65 can be adapted to accommodate a variety of needs and circumstances.

b. Exemplary User Computing Entity

FIG. 3 provides an illustrative schematic representative of user computing entity 30 that can be used in conjunction with embodiments of the present invention. As will be recognized, the user computing entity may be operated by an agent and include components and features similar to those described in conjunction with the analytic computing entity 65. Further, as shown in FIG. 3, the user computing entity may include additional components and features. For example, the user computing entity 30 can include a network interface 320, an antenna 312, a transmitter 304 (e.g., radio), a receiver 306 (e.g., radio), and a processing element 308 that provides signals to and receives signals from the network interface 320 and/or the transmitter 304 and receiver 306, respectively. The signals provided to and received from the transmitter 304 and the receiver 306, respectively, may include signaling information/data in accordance with an air interface standard of applicable wireless systems to communicate with various entities, such as an analytic computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the analytic computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Reference will now be made to FIGS. 4-14 in the following discussions of various embodiments for generating recommended strategies for interacting with customers during customer-service interactions, according to various embodiments.

a. Brief Overview

Certain embodiments utilize results of actual interactions between customer service representatives and members (also referred to interchangeably as "clients," or "customers") to develop customer-specific recommendations for holding interactions with individual customers. The customer-specific recommendations may comprise a recommended ordered listing of talking points for discussing particular topics with the customer (identified within a customer-specific generated ranked order associated with a plurality of topics), specific topical keywords to utilize when discussing the one or more topics with the specific customers, as well as any customer-specific salutation recommendations (e.g., this customer feels more comfortable when conversations begin slowly, such as by asking how the customer is feeling before beginning any substantive discussions).

The recommendations for specific customers are generated based at least in part on the results of interactions between customer service representatives and customers. These interactions may be recorded phone interactions, recorded online chat interactions, recorded in person interactions, recorded email interactions, and/or the like. Recorded interactions are reviewed automatically, for example, via supervised or unsupervised machine-learning models to identify the effectiveness of specific interaction strategies with individual customers. For example, reviewing interactions may comprise identifying (a) an order of discussion of various topics with the customer, (b) whether the customer had a desirable reaction (e.g., accepting a service), (c) the amount of time taken between the beginning of an interaction until the time the customer had the desirable reaction, (d) what salutations were used with the customer, and/or the like. This data may be supplemented with supplemental data about the customer, such as data retrieved from a customer database, data retrieved from one or more external data sources (e.g., weather data where the customer is located, credit data regarding the customer, and/or the like).

Determinations about the effectiveness of a particular interaction with a particular customer may be stored in the model data store 213, together with similar determinations about the effectiveness of interactions with other customers. The effectiveness of a particular interaction may be indicated via one or more metrics, such as a binary determination of whether the customer accepted a presented product/service, a time-based determination of the length of time between the start of a customer-service interaction and acceptance of a presented product/service, a quantitative determination of the quantity of a particular product/service purchased, and/or the like. In certain embodiments, the similarity between customers may be determined, such as via a machine-learning customer-similarity model configured to consider the supplemental data stored in association with data indicative of the determined effectiveness of interactions with customers. Based on determined similarities between customers, a customer-similarity model, such as a machine-learning model, may determine whether a particularly effective interaction strategy with a first customer may be similarly effective with a second customer, such that data regarding the effectiveness of particular interactions with customers may be utilized with a plurality of customers. In certain embodiments, a confidence score may be generated via the customer-similarity model indicating a determined likelihood that a strategy utilized with success with one customer will be similarly successful with another customer.

Utilizing the determined effectiveness of interactions with a plurality of customers, a recommendation model may be configured to generate customer-specific recommendations for holding interactions with individual customers, for example, in real-time, as a customer initiates an interaction with a customer service representative. These recommendations may be updated, such as to provide an updated ordered listing of talking points (e.g., by updating a selection of a recommendation model, by updating parameters of a recommendation model, and/or the like) in real-time, based on identified key words, reactions, additional supplemental data (e.g., supplemental data specific to the particular interaction) and/or the like occurring during an interaction, such that the customer service representative may be guided to provide customer-specific help to the customer, in an effort to increase customer satisfaction with interaction.

1. Technical Problem

Customer-service interactions have generally required that customer service representatives utilize generic scripts or suggestions for discussing one or more topics with all customers that initiate a customer service interaction. Customer service representatives have generally been provided with minimal information about customers who initiate customer service interactions, and therefore those customer service representatives must rely on generic scripts or recommendations for discussing one or more topics with those customers. Those generic scripts are provided to customer service representatives to be applicable to all customers, and thus the generic scripts are generally constructed with some undefined "average" customer in mind—the scripts may provide customer service representatives with information regarding what interaction strategies have, on average, resulted in the shorted interactions with customers, the highest customer satisfaction, the highest rate of customer agreement, and/or the like. However, because customers/members have a finite attention span, these generic scripts may not enable customer service representatives to take full advantage of the generally short time period during which a customer/member is devoting their attention to the customer service representative. Because customers are highly non-uniform in their characteristics, tastes, and/or the like, there has historically been no technical solution for identifying customer-specific interaction strategies for customer service interactions.

2. Technical Solution

To overcome at least the above-identified technical challenges, various embodiments encompass systems and methods for extracting data indicative of the effectiveness of various customer service interactions from those customer service interactions, for identifying similarities between customers based on supplemental data retrieved for each of those customer service interactions, and for generating recommendations for interacting with a particular customer based on those identified similarities. Such embodiments thereby enable generation of customer-specific recommendations for interacting with specific customers during customer-service interactions utilizing machine-learning models. Accordingly, upon a customer initiating a customer-service interaction, recommendations for interacting with the customer may be generated in real-time and may be updated in real-time as the customer-service interaction progresses.

b. Customer-Service Interaction Data Extraction

As noted above, various embodiments utilize data extracted from historical customer-service interactions in generating recommendations for conducting future customer-service interactions. In various embodiments, customer-service interactions may comprise telephone calls (e.g., telephone calls recorded by one or more recording mechanisms, such as a processing device of the analytic computing entity 65, a processing device of a user computing entity 30 associated with a customer service representative, and/or the like), video conferences (e.g., video conferences recorded by one or more recording mechanisms, such as a processing device of the analytic computing entity 65, a processing device of a user computing entity 30 associated with a customer service representative, and/or the like), online chats (e.g., online chats stored in a memory of the analytic computing entity), and/or the like. As discussed herein, customer-service interactions may be recorded and/or analyzed in real-time (e.g., so as to provide real-time recommendations for carrying out the customer-service interactions based on reactions of the customer). However, in certain embodiments, customer-service interactions may additionally or alternatively be recorded for later analysis, such as for generation of training data for recommendation generation models.

Figure 4:
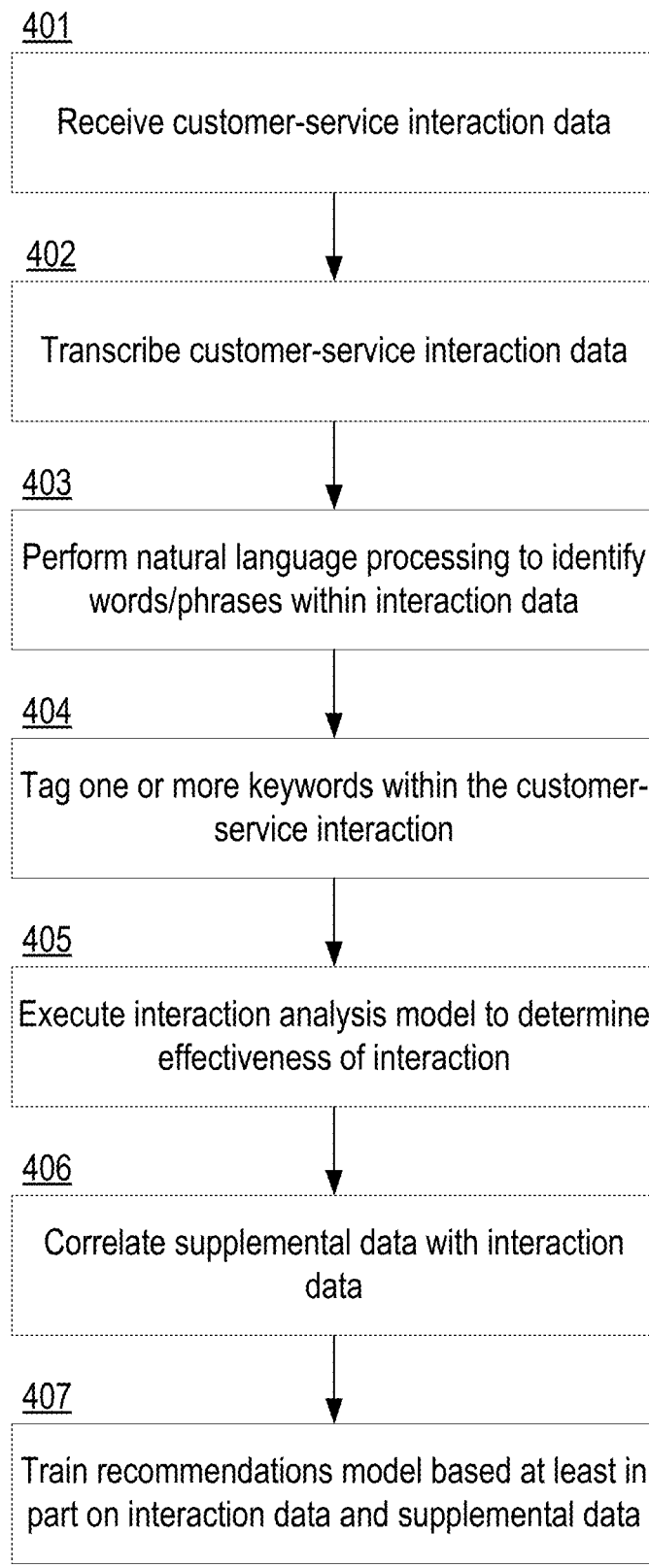
FIG. 4 is a flowchart illustrating functionality for analyzing customer-service interactions.

FIG. 4 illustrates various steps associated with performing intake and analysis of customer-service interaction data in accordance with certain embodiments. As noted above, customer-service interactions may be received at an analytic computing entity 65, such as by being recorded and/or stored within a memory of the analytic computing entity 65 for analysis (as reflected at Block 401 of FIG. 4). Particularly for those customer-service interactions comprising audio (e.g., telephone calls, video conferences, and/or the like), the analytic computing entity 65 may be configured to execute one or more automatic transcription models (e.g., including natural language processing (NLP) and/or other language recognition models) to extract a transcript of a customer-service interaction as indicated at Block 402. Other customer-service interactions may naturally generate a complete transcript, such as online chats or emails comprising a series of responsive text-based messages (and/or video, photo, or other multi-media messages) between a customer and the customer-service representative, wherein each message may have an associated timestamp. In certain embodiments, the automatic transcriptions models may comprise standardized speech-to-text models, machine-learning based models (e.g., trained via supervised learning training algorithms) and/or the like. The generated transcription may identify speech from the customer-service representative (e.g., which may be identified based on metadata associated with audio generated from a microphone associated with the customer-service representative; identified based on voice-recognition models, and/or the like) and speech from the customer, so as to distinguish between speakers within the transcript.

Once a transcript of a customer-service interaction is generated, the analytic computing entity 65 is configured to identify one or more keywords and/or key phrases (collectively referred to herein as "keywords") within the transcript as indicated at Block 403. Those keywords may comprise topical keywords that may be mapped to particular topics within talking point data of a topics data store 211 and/or may be indicative of the customer-service representative presenting a particular topic to the customer, reactive keywords indicative of a customer reaction, such as a negative reaction (e.g., "No thanks, I'm not interested"), a positive reaction (e.g., "Yes, sign me up;" "Please send me more information;" and/or the like) and/or the like. At least a portion of the keywords identified within the topics data store 211 and searched by the analytic computing entity 65 within transcripts of historical customer-service interactions may be identified manually (e.g., based on newly introduced topics for discussion). In certain embodiments, at least a portion of the keywords searched by the analytic computing entity 65 may be identified automatically, such as via a machine-learning model configured to automatically identify keywords (e.g., reflected within the topics data store 211) and/or to associate groups of similar keywords to identify common threads of association between keywords, such as identifying common topics referred to by different keywords. In embodiments configured to identify potential new topical key words, such a machine-learning model may be, for example, a clustering model trained via supervised or unsupervised learning utilizing a plurality of historical customer-service interaction transcripts as training data to flag particular words/phrases within one or more transcripts as potential topical keywords and/or to map those potential topical keywords to particular topics reflected within the topics data store 211 and/or to suggest potential new topics for storage in the topics data store 211. It should be understood that any of a variety of keyword identification methodologies may be utilized in certain embodiments.

Figure 5:
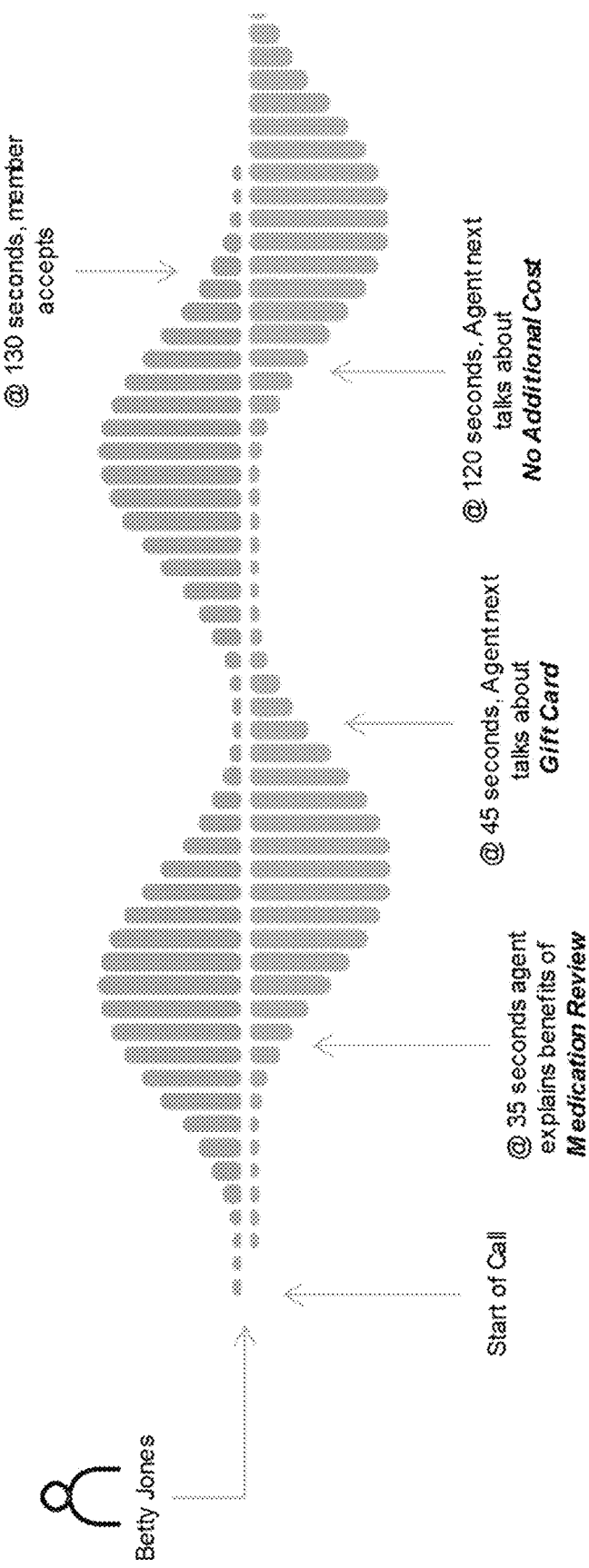
FIG. 5 is a graphical depiction of analysis of a customer-service interaction.

The analytic computing entity 65 may tag each of a plurality of identified keywords (e.g., topical keywords and/or reactive keywords) within the transcript with a timestamp as indicated at Block 404 of FIG. 4, identified based at least in part on metadata identifying when in the customer-service interaction the keyword was said, so as to enable a comparison of the amount of time between the presentation of a particular topic and the customer's reaction, the order in which topics were presented, or variations and synonyms of keywords presented, and/or the like. FIG. 5 graphically illustrates an interaction (e.g., a call) with hypothetical customer Betty Jones. After the start of the call, the keyword "Medication Review" is mentioned at 35 seconds into the call (indicated by the illustrated timestamp), then at 45 seconds, the customer-service representative mentions the prospect of receiving a gift card (indicated by the corresponding keywords) if the customer participates in a particular program, and finally, the customer-service representative mentions that the particular program is offered at no additional cost to the customer. At 130 seconds, the customer accepts (as identified by one or more reactive keywords).

In certain embodiments, the analytic computing entity 65 may be further configured to identify tones of the customer (e.g., based at least in part on changes in pitch of the customer's speech, changes in rate of the customer's speech pattern, changes in average length of phrases spoken by the customer, and/or the like), such as via a machine-learning based voice-analysis model (e.g., trained via supervised learning models). In such embodiments, changes in tone of the customer may be tagged with a timestamp and a categorization tag identifying the tone adopted by the customer (e.g., at 25.453 minutes, the customer became frustrated) so as to enable an analysis of correlations between topics of discussion and the customer's reaction.

In certain embodiments, the analytic computing entity 65 may generate a compressed representation of a customer-service interaction to be embodied as interaction data, comprising data indicative of keywords mentioned (and/or changes in tone identified) and timestamps associated with each of those keywords. The compressed representation of the customer-service interactions enable easy comparisons between a plurality of customer-service interactions so as to determine a most-effective customer-service interaction strategy for various customers. In certain embodiments, the compressed representation of a customer service interaction may comprise indications of combinations of multiple keywords (e.g., combinations of two keywords, three keywords, and/or the like) as well as the order in which the keywords were mentioned during the customer-service interaction. The combinations may be converted into binary flags within the compressed representation to indicate the presence of a particular combination (which may be order-specific). In certain embodiments, combinations may be limited to keywords said within a defined time period of one another (e.g., 30 seconds), such that keywords said more than the defined time period apart are treated as separate keywords and interactions. To ensure adequate weight is attributed to various combinations of keywords, regardless of frequency of use, the analytic computing entity 65 loops through each customer-service interaction within a given cluster (e.g., a customer-service interaction associated with a customer within a cluster) to add/remove customer-service interactions from training data for a given cluster until all keywords and/or keyword combinations are represented with equal weight.

In various embodiments, the analytic computing entity 65 executes an interaction analysis model to determine the effectiveness of a customer-interaction based at least in part on the interaction data, as indicated at Block 405 of FIG. 4. The interaction analysis model of certain embodiments identifies and considers various characteristics of customer-service interactions to determine the effectiveness. For example, the interaction analysis model may be configured to determine the overall elapsed time of the customer-service interaction, the number of topics discussed during the customer-service interaction, the elapsed time between the beginning of a discussion of a particular topic and the end of a topic of a particular discussion (e.g., based at least in part on a topical keyword identified as beginning the topical discussion and a reactive keyword indicating the customer's final thoughts on the topic), whether the customer accepted or declined a particular topic, the customer's tone at various points during the customer-service interaction, and/or the like. The overall effectiveness of a customer-service interaction may be compared against one or more standardized benchmarks (e.g., a maximum customer-service interaction time, a minimum number of customer acceptances, and/or the like). In other embodiments, the analytic computing entity 65, through the interaction analysis model, is configured to compare characteristics of a plurality of customer-service interactions relative to one another, so as to determine a relative effectiveness of a customer-service interaction between a plurality of customer-service interactions. As discussed in greater detail herein, comparisons between customer-service interactions may be limited to comparisons between customer-service interactions associated with a single cluster (e.g., customer-service interactions may be compared within any one cluster, so as to determine the relative effectiveness of customer-service interactions with customers of a particular cluster). Determinations of a most-effective customer-service interaction (or portions of a customer-service interaction) may be generated in accordance with a machine-learning model, as discussed in greater detail herein for generating recommended strategies for interacting with particular customers.

Moreover, the analytic computing entity 65 of certain embodiments is configured to associate customer identifying data with the compressed representation of the customer-service interaction (and/or the recording of the customer service interaction). The customer identifying data may comprise a customer name, a customer unique identifier, and/or the like. The customer identifying data may be provided by a user computing entity 30 associated with the customer-service representative involved in the customer-service interaction, by the analytic computing entity 65 (e.g., during the customer-service interaction) based at least in part on data/information provided by the customer during the customer-service interaction (e.g., the customer may orally provide a unique identifier, the customer may enter a unique identifier (e.g., via a touchtone phone, via a user computing entity 30, and/or the like) to initiate a customer-service interaction, and/or the like).

Utilizing the customer identifying data to uniquely identify a particular customer, the analytic computing entity 65 may be configured to request and/or retrieve supplemental data to be stored in association with the interaction data (e.g., the compressed representation of the customer-service interaction and/or the recording of the customer service interaction), as indicated at Block 406. The analytic computing entity 65 may be configured to generate a request comprising a unique customer identifier (e.g., the customer's name, a unique identifier associated with the customer, contact information for the customer, and/or the like), and to utilize the request to query one or more data sources, such as one or more customer databases storing additional data regarding a customer. As just one example, the customer database may comprise data indicative of healthcare records associated with the customer (e.g., indicative of recent medical procedures performed, indicative of medications taken by the customer, indicative of a most recent time the customer visited a healthcare location, and/or the like). As yet another example, the customer database may comprise additional biographical data regarding the customer, such as a customer location (e.g., a customer home location), customer relatives (e.g., names and/or unique identifiers of relatives, and/or the like), and/or the like. In certain embodiments, the analytic computing entity 65 may be configured to transmit the request to one or more external systems (e.g., external computing systems, external data storage systems, and/or the like) to request supplemental data regarding the customer. For example, the analytic computing entity 65 may be configured to query a credit reporting bureau to obtain credit data, income data, and/or the like regarding the customer, and such data may be received by the analytic computing entity 65 for inclusion as supplemental data.

In certain embodiments, the analytic computing entity 65 may update the generated request for supplemental data after receipt of at least a portion of the supplemental data, to obtain additional supplemental data. For example, upon receipt of data indicative of a customer's location, the analytic computing entity 65 may request weather data regarding the location from an external source, such weather data may be received and added as supplemental data. As yet another example, upon receipt of biographical data indicative of one or more relatives, the analytic computing entity 65 may be configured to retrieve healthcare related data regarding those relatives for inclusion as supplemental data for a customer. It should be understood that any of a variety of supplemental data may be received and/or requested from any of a variety of data sources.

In certain embodiments, upon receipt of the supplemental data, the supplemental data may be stored in association with a customer profile (e.g., temporarily and/or until updated). As discussed herein, the supplemental data may be utilized to identify similarities between customers (e.g., via a machine-learning algorithm), and accordingly the data stored within the customer profile may be utilized to establish links between customer profiles. In other embodiments, the supplemental data may be stored in association with the compressed representation of the customer-service interaction (and/or the recording of the customer service interaction). In such embodiments, requests for supplemental data may be generated separately for each customer-service interaction, even for customer-service interactions involving the same customer. In yet other embodiments, the supplemental data may be stored in association with both a customer profile and the compressed representation of the customer-service interaction (and/or the recording of the customer service interaction), such that separate requests for supplemental data need not be generated for multiple customer-service interactions involving the same customer.

In other embodiments, the supplemental data may comprise customer supplemental data, indicative of characteristics of the customer that are unaffected by the customer-service interaction (e.g., the customer's contact information, location, healthcare data, relatives, weather, and/or the like); and interaction supplemental data, indicative of the customer that are specific to a particular customer-service interaction (e.g., the customer's mood/tone (determined utilizing one or more machine-learning models as discussed above), the time of day of the customer-service interaction, the day of week of the customer-service interaction, and/or the like. In such embodiments, the customer supplemental data may be associated with a customer-profile, while the interaction supplemental data may be associated only with the compressed representation of the customer-service interaction (and/or the recording of the customer service interaction).

As mentioned above, the analytic computing entity 65 may be configured to perform one or more customer-service interaction analysis procedures in real-time for an ongoing customer-service interaction. For example, the analytic computing entity 65 may receive ongoing recordings of an ongoing customer-service interaction, generate and/or update a transcript in real-time, identify keywords (and/or changes in a customer's tone), and/or the like, so as to determine the effectiveness of an ongoing customer-service interaction, and/or to generate recommendations for improving the customer-service interaction moving for the remainder of the customer-service interaction, as discussed herein. Accordingly, as indicated at Block 407 of FIG. 4, the analytic computing entity 65 is configured to utilize the interaction data and/or the supplemental data to (a) determine one or more machine-learning models to train utilizing data associated with various customer-service interactions, and (b) to train the appropriate recommendation models so as to enable generation of appropriate recommendations for future customer-service interactions.

c. Customer Similarity Modeling

Figure 6:
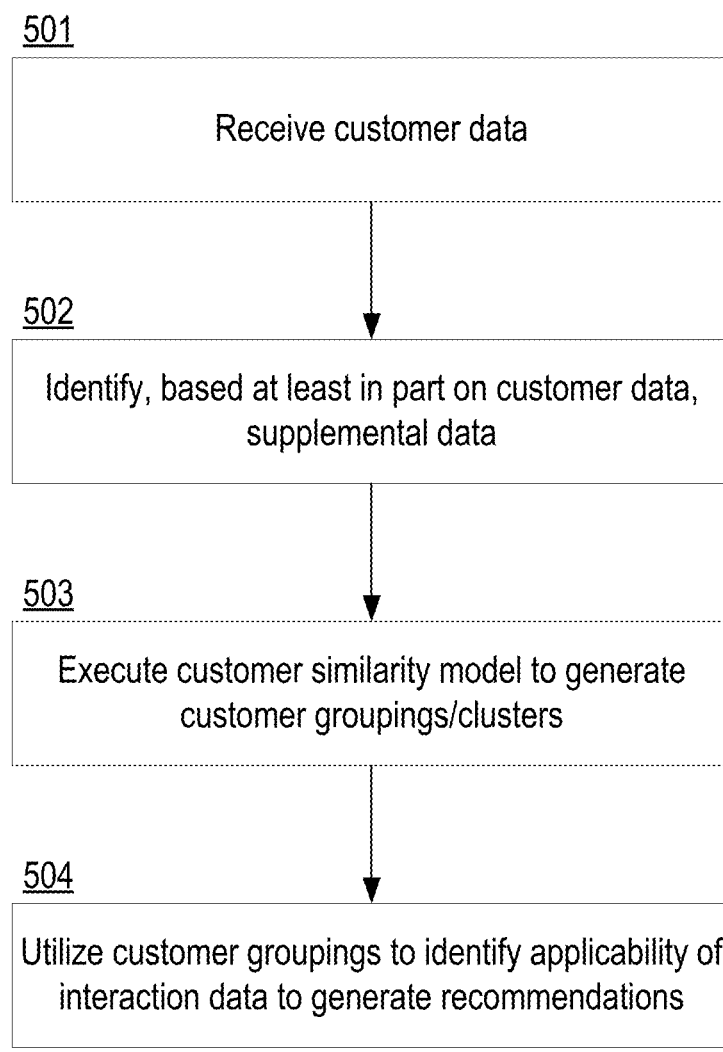
FIG. 6 is a flowchart illustrating functionality for determining similarities between customers.

Moreover, as discussed above, the analytic computing entity 65 may be configured to execute one or more customer similarity models to identify similarities between customers. FIG. 6 illustrates various steps performed for identifying similarities between customers in accordance with certain embodiments. Identified similarities between customers may enable the application of learnings regarding customer-service interaction strategies for one customer (e.g., based on historical customer-service interactions with the one customer) to a second customer having one or more determined-similar characteristics. The customer similarities may be determined by executing one or more customer-similarities models based at least in part on supplemental data stored in association with the customer-profile and/or the interaction data. As indicated in FIG. 6, various embodiments begin with receipt of customer data (which may be presented together with interaction data and/or supplemental data, or independently of other data) as indicated at Block 501. Whether received together with the customer data or identified separately, the analytic computing entity 65 then identifies supplemental data associated with the customer data, as indicated at Block 502. For those embodiments in which the supplemental data comprises customer-supplemental data and interaction-supplemental data, the analytic computing entity 65 may be configured to execute one or more customer similarity models based at least in part on customer-supplemental data and to execute one or more customer similarity models based at least in part on interaction-supplemental data. In such embodiments, similarities may be determined generally between customers, as well as similarities between various customers under different conditions, as reflected by the interaction-supplemental data. Accordingly, a single customer may be reflected within a plurality of customer clusters, based on interaction-supplemental data. For example, during warm summer months, the customer may be found to be more conducive to longer customer-service interactions, and is particularly receptive to a longer salutation prior to discussing the substance of a call. However, that same customer may be found to be less conducive to longer discussions during colder months, when the customer has historically reflected a desire to keep customer-service interactions short. Thus, the same customer may be reflected within a first customer cluster during warm summer months, and a second customer cluster during cold winter months.

A customer similarity model (executed as reflected at Block 503 of FIG. 6) may be embodied as a machine-learning model, such as a clustering model (e.g., an unsupervised k-means clustering model, mean-shift clustering algorithm, Gaussian Mixture Models (GMM) or Density-Based Spatial Clustering of Applicants with Noise (DB-SCAN)) configured to generate clusters of customers determined to have similar characteristics. The customer-similarity model may be trained via unsupervised learning, utilizing supplemental data stored in association with a plurality of historical compressed representations of customer-service interactions (and/or recording of historical customer service interactions). The customer similarity model may be configured for classifying newly received supplemental data, such as additional supplemental data collected in association with an ongoing customer-service interaction, in real-time into at least one of the generated clusters of the training data. Accordingly, the customer similarity model may be configured to enable real time classification of supplemental data during ongoing customer-service interactions, so as to determine (or update) applicable customer-service interaction recommended strategies for interacting with the customer and to enable presentation of these recommendations to a customer-service representative (as indicated at Block 504).

In certain embodiments, the supplemental data associated with the plurality of customer-profiles and/or the interaction data (e.g., the plurality of compressed representations of the customer-service interactions and/or corresponding recordings of the customer service interactions) may be reviewed utilizing the customer similarities models to generate clusters of a plurality of customers, wherein each cluster comprises a plurality of customer-profiles having supplemental data deemed similar by the customer similarity model. These clusters may be updated, for example, periodically (e.g., daily, weekly, monthly, and/or the like) utilizing supplemental data received during the period since the last update, so as to ensure that generated clusters remain up-to-date. As various examples, clusters may be generated based at least in part on prescription data, such as (1) the number of prescriptions purchased over a given time period (e.g., 6 months) for a first therapeutic class; (2) the number of prescriptions purchased over a given time period (e.g., 6 months) for a second therapeutic class; (3) the overall cost of prescriptions purchased over a given time period (e.g., 1 year); (4) the overall cost of prescriptions of a third therapeutic class purchased over a given time period (e.g., 1 year); and/or the like. As another example, clusters may be generated based at least in part on medical claims data, such as (1) the number of visits in a previous time period (e.g., 6 months) for a first diagnosis; (2) the number of visits in a previous time period (e.g., 1 year) for a second diagnosis; (3) the overall cost of visits in a given time period (e.g., 6 months) for a third diagnosis; (4) the overall cost of visits in a given time period (e.g., 3 months) for a fourth diagnosis; and/or the like. As yet another example, clusters may be generated based at least in part on demographic data, such as (1) estimated household income; (2) hobbies/interests; (3) education level; (4) aggregate credit; (5) household composition; (6) digital behaviors; and/or the like. It should be understood that clusters may be generated based at least in part on any combination of such data, or other data in certain embodiments.

Utilizing the generated clusters, supplemental data received (e.g., in real-time during ongoing customer-service interactions) may be categorized into one of the plurality of generated clusters, such that similarities between the supplemental data obtained during an ongoing customer-service interaction and existing, previously categorized supplemental data may be identified. In certain embodiments, the determination of a cluster for association with supplemental data may utilize a scoring algorithm, such that each cluster may be given a similarity score for a set of supplemental data based on determined similarities between the supplemental data and each of a plurality of clusters. The analytic computing entity 65 may be configured to assign the supplemental data to the cluster having the highest similarity score.

As discussed herein, learnings from customer-service interactions may be shared within a cluster, such that learnings from a customer-service interaction having associated supplemental data assigned to a first cluster may be shared with a new cluster-service interaction determined to have supplemental data assigned to the same cluster. As discussed in greater detail herein, one or more recommendation models may be generated (e.g., one or more recommendation models operable within each cluster) so as to generate recommendations for conducting customer-service interactions with customers determined to have supplemental data corresponding to the cluster.

FIG. 7 provides example results of similarity determinations between two hypothetical customers, John Smith and Betty Jones. For example, supplemental data determined to be associated with John Smith indicates that John Smith has purchased 7 prescriptions in the last 6 months, lives in an area with high pollen content in summer months, and several other supplemental data points as indicated in FIG. 7. Supplemental data determined to be associated with Betty Jones indicates that Betty Jones has purchased 8 prescriptions in the last 6 months, and lives in an area with moderate pollen content in summer months, among several other supplemental data points. Based at least in part on the supplemental data, a customer-similarity model may determine that John and Betty have a similarity rating of 86%, which may be sufficient to place John and Betty within a shared customer-cluster (e.g., with other customers determined to have a sufficiently high similarity rating with John and Betty). Moreover, based on the fact that John and Betty have a high similarity score, a recommendation model may determine that, because John accepted a house call service when a customer-service representative highlighted the Medication Review features of the house call service, it is likely that Betty will similarly accept the house call service based on similar highlighted features.

d. Customer-Service Interaction Recommendation Generation

Finally, as noted above, the analytic computing entity 65 may be configured to generate data indicative of recommended strategies for conducting customer-service interactions with customers, based at least in part on the determined similarities between supplemental data. In certain embodiments, strategies for conducting customer-service interactions may be embodied as recommended topics to discuss with customers (represented by recommended topic keywords) and more specifically, recommended keywords to utilize when discussing those topics with customers. In certain embodiments, strategies for conducting customer-service interactions may be further embodied as a recommended order in which to discuss various topics with the customer, as well as general salutations, greetings, or other generalized conversational strategies for holding a conversation with the customer. As discussed in greater detail in the following subsections, one or more user interface screens providing data indicative of one or more recommended strategies for holding a conversation with the customer may be provided to a customer-service representative. Because customer-service interactions are generally short in duration (on the order of a few minutes), these user interfaces must be presented to the customer-service representative quickly after initiation of a customer-service interaction, and therefore backend generations of the recommended strategies for conducting customer-service interactions must be performed quickly and in real-time.

FIG. 8 illustrates various steps associated with generation of recommendations (e.g., ordered listings of talking points) for strategies for holding customer-service interactions with customers according to various embodiments.

Generation of a customer-service interaction recommendation begins with the generation of an initial recommendation for a customer, upon initiation of a customer-service interaction by the customer. Thus, upon a customer initiating a customer-service interaction, the analytic computing entity 65 may request and/or receive customer identifying data, as indicated at Block 605 of FIG. 8. As discussed herein, the customer identifying data may be provided by the customer (e.g., entering identifying data into a user interface screen presented to the customer prior to initiating a user computing entity-based customer service interaction (e.g., an online chat), entering identifying data via a touch-tone phone when the customer initiates a phone-based customer service interaction, by the customer relaying identifying data to the customer-service representative upon initiation of the customer-service interaction, and/or the like), the customer identifying data may additionally or alternatively be retrieved automatically by the analytic computing entity 65.

The customer-identifying data may be retrieved automatically, for example, by the analytic computing entity 65 identifying a source of the customer-service interaction (e.g., a phone number associated with the customer call, an IP address associated with a customer chat request, and/or the like), and the analytic computing entity 65 may be configured to determine whether the source of the customer-service interaction matches any customer profiles (e.g., by querying the customer database). It should be understood that the customer data may be received via any of a variety of methodologies, such as based on a customer sign-in information (e.g., a user name and password), cookies stored on the customer's user computing entity 30, and/or the like.

Upon receiving the customer identifying data, the analytic computing entity 65 of certain embodiments is configured to generate a recommended strategy for the customer-service interaction, which may be embodied as a recommended listing of talking points (e.g., topics, keywords, salutations, and/or the like). To generate such a recommendation, the analytic computing entity 65 of certain embodiments is configured to identify a cluster associated with the customer identifying data. As noted above, the customer identifying data may be associated with a customer profile, which in turn may be associated with supplemental data usable by the analytic computing entity 65 with a customer similarity model to group the customer into one or more clusters of determined similar customers (e.g., determined based at least in part on supplemental data as discussed above). For clarity, the clusters may be determined prior to the initiation of a customer-service interaction, so as to minimize latency associated with identifying a cluster relevant to a customer that initiated a customer-service interaction.

Based on the identified cluster, the analytic computing entity 65 may be configured to identify one or more customer-service interaction strategies identified for the cluster. As mentioned above, these general customer-service interaction strategies may be generated via one or more machine-learning models, based at least in part on historical data indicative of customer-service interactions. In certain embodiments, these customer-service interaction strategies that are identified for a cluster may be sufficiently specific that one or more user interfaces may be generated to present data indicative of the customer-service interaction strategies for the customer-service representative. For example, a general customer-service interaction strategy may comprise an ordered listing of topics (e.g., indexed by topical keywords) representative of all topics addressed within customer-service interactions and/or reflected within the topic data store 211. Moreover, the general customer-service interaction strategy for a cluster may identify one or more salutations recommended for use with a customer, and/or the like.

However, in other embodiments, the cluster-specific customer-service interaction strategies may be provided at a general level, that the analytic computing entity 65 is then configured to apply to the specific circumstances of the specific customer-service interaction. For example, an overall recommendation for a cluster may be embodied as an overall list of potential topics for discussion, ordered based on a recommended order for discussion. However, the analytic computing entity 65 may be configured to identify a purpose for the customer-service interaction, which may limit the number of relevant topics (and their respective keywords) within the overall recommendation for the cluster. In other embodiments, a determined purpose for a customer-service interaction may be utilized by the analytic computing entity 65 to reorder a recommended order of discussion to better tailor the discussion for the customer-service interaction's purpose. In certain embodiments, the analytic computing entity 65 is configured to identify a purpose of a customer-service interaction based at least in part on customer-input (e.g., based on a phone number called to initiate the customer-service interaction (e.g., a first number may be associated with "billing questions" and a second number may be associated with "new customer initiation"), a series of button presses within a phone-based menu, user input (e.g., from a drop-down menu) when initiating a user computing-entity-based customer service interaction, and/or the like).

Based on the determined purpose for the customer-service interaction, the analytic computing entity 65 may be configured to generate a recommended strategy for specific circumstances of the customer-service interaction. The analytic computing entity 65 may be configured to select a preconfigured recommendation stored in association with the cluster (e.g., each cluster may have a plurality of recommendations stored therewith). In other embodiments, the analytic computing entity 65 may be configured to generate a recommended strategy for addressing the customer-service interaction at least in part by identifying one or more relevant aspects of a general recommendation for a cluster (e.g., such as assigned weights for each of a plurality of topics) and to reassemble the recommendation utilizing those relevant aspects—while ignoring other aspects deemed not relevant.

As yet another specific example, generating a recommended strategy for engaging in a customer-service interaction may comprise retrieving a cluster-specific recommendation model (e.g., a machine-learning model built specifically for a particular customer cluster) and applying the retrieved cluster-specific recommendation model for generating a recommendation for the specific customer. The recommendation model may be a supervised machine-learning model, utilizing keywords (or combinations of keywords) as independent variables, and characteristics of the output of the customer-service interaction as dependent variables (e.g., whether the customer accepted and/or the duration of the interaction). The recommendation model may be selected for each cluster from a plurality of available models, such as logistic regression models, decision tree models, gradient boosted tree models (e.g. xgboost), random forest models, neural network models, and/or the like. In certain embodiments, different clusters may utilize different model types, and each cluster may further be characterized by cluster-specific parameters. For example, a first cluster may utilize a logistic regression model with a first set of parameters, and a second cluster may utilize a neural network model with a second set of parameters. As yet another example, generating a recommended strategy for engaging in a customer-service interaction may comprise retrieving one or more parameters (e.g., cluster-specific parameters) for use by a general recommendation model (e.g., each cluster may utilize the same model type) so as to tailor the results of the recommendation model based on the determined cluster applicable to the customer. For example, the one or more parameters may comprise weights assigned to each of a plurality of topics, those weights being generated based at least in part on a determined relevance of the particular topic to the cluster.

The recommendation model retrieved for a particular cluster, or the cluster-specific parameters usable by a generalized recommendation model may be utilized to assign a relevance score to each of a plurality of topics (e.g., retrieved from the topics data store 211). The relevance scores of various embodiments are indicative of the predicted importance of a particular talking point to reach a positive outcome of a customer-service interaction. Higher relevance scores generally correlate to topics predicted to be more important to a customer, and therefore these topics are ranked higher such that the analytic computing entity 65 suggests that the topics are addressed earlier in a customer-service interaction. In certain embodiments, the analytic computing entity 65 may be configured to generate negative relevance scores for certain topics, indicating these topics are likely to impair the customer-service representative's ability to reach a positive outcome of the customer-service interaction. In certain embodiments, relevance scores may be generated for individual types of customer-service interactions (e.g., when holding a customer-service interaction via phone, utilize a first set of relevance scores for a particular individual; when holding a customer-service interaction via online chat, utilize a second set of relevance scores for a particular individual; and/or the like). In other embodiments, a single set of relevance scores may be generated for each of a plurality of customers, however each topic may further comprise one or more interaction type flags, indicating whether a particular topic is recommended for use in the corresponding customer-service interaction type. For example, a first topic may have a highest relevance score, however the interaction type flags may indicate that the first topic is recommended for use in phone-based customer-service interactions, but not for online chat-based customer service interactions.

In certain embodiments, the recommendation model utilized to assign relevance scores to the topics may be configured to consider interaction-supplemental data in assigning the relevance scores for one or more topics. For example, interaction-supplemental data for a particular interaction may indicate that the customer just received 20" of snow overnight (thus suggesting that the customer may be incapable of leaving his/her home), which may influence relevance scores assigned to topics such as home-delivery, or in-home care.

Based on the assigned relevance scores for each of a plurality of topics, the analytic computing entity 65 generates an ordered recommended listing of topics for discussion with the customer, by generating a list that is ordered based on the assigned relevance scores for the topics, as well as the corresponding keywords to be utilized during the discussion. In various embodiments, the ordered recommended listing of topics for discussion with the customer may be stored within a memory associated with the analytic computing entity 65 within a table having an individual entry for each talking point and member combination, and each table entry identifies the relevance score of the talking point for the particular customer. Thus, the entries may be stored based on relevance score to provide a ranked order listing of talking points for discussion with the particular customer. The data reflected within the table may be provided to the customer-service representative via one or more graphical user interfaces, as discussed in greater detail herein.

As discussed in greater detail herein, the analytic computing entity 65 may then provide the recommended listing to a customer-service representative as indicated at Block 603 (e.g., via one or more user interface screens).

Figure 9:
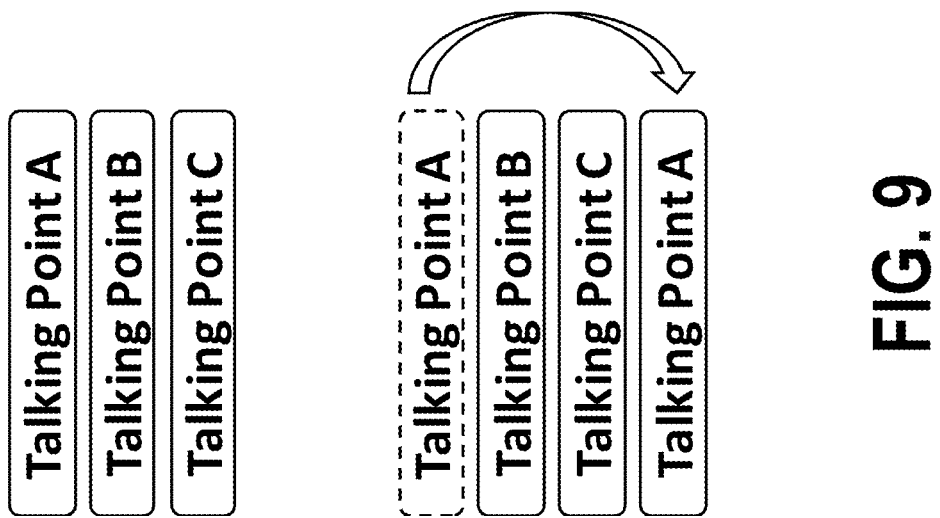

As indicated at Block 604, the analytic computing entity 65 is configured to monitor interaction data generated during an ongoing interaction. For example, the analytic computing entity 65 may generate a transcript (e.g., in real-time) as discussed above, may identify timestamps associated with specific keywords (reactive keywords and/or topical keywords), may identify data indicative of a change in tone of the customer, and/or the like. Based on the interaction data of the specific interaction, the analytic computing entity 65 may be configured to update any customer data and/or supplemental data originally utilized for selecting and/or utilizing a recommendation model for generating the initial recommendation for the customer-interaction, as indicated in Block 606. For example, upon determining that the customer is angry (e.g., receiving additional, interaction supplemental data indicating the customer is angry), the analytic computing entity 65 may be configured to reassign the customer to a different customer cluster having a different recommendation model and/or recommendation model parameter utilized for generating a recommended listing of topics for discussion. As reflected by the looping arrow in FIG. 8, an updated recommended listing of talking points may be generated for the customer-service interaction, and a user interface may be provided to the customer-service representative presenting these updated recommendations. FIG. 9 illustrates just one example change that may occur between an initial recommendation generated for a customer and an updated recommendation generated during the customer-service interaction. For example, shortly after initiation of the customer-service interaction, the customer may aggressively request to discuss "Talking Point B." Thus, the recommendation engine may be configured to reorganize the recommended listing of talking points such that Talking Point B is recommended first, and Talking Point A (which would have been recommended as a first talking point) is demoted within the ordered list (e.g., the relevance score is decreased). This process may repeat throughout the duration of the customer-service interaction, so as to provide the customer-service representative with relevant, updated recommendations for addressing the customer during the customer-service interaction, based at least in part on the progression of the customer-service interaction.

Moreover, as indicated at Block 605, upon completion of a customer-service interaction, the interaction data may be stored and/or utilized as training data for one or more models, such as recommendation models, customer similarity models, and/or the like. It should be understood that in certain embodiments, processes for generating customer clusters, for identifying appropriate recommendation models for individual clusters, for generating cluster-specific parameters for use with specific clusters, and/or the like, may be iterated (e.g., periodically at defined time intervals) so as to refine the accuracy of customer cluster generation, and to refine the accuracy of models utilized for generating recommendations for customers within specific clusters. In certain embodiments, the selection of a particular model for a cluster may be generated together with a predicted accuracy score, indicative of the predicted accuracy of recommendations generated by the model. Utilizing the predicted accuracy score, the analytic computing entity 65 may be configured to iterate through various potential clusters, models, parameters, and/or the like so as to generate a particular combination of customer clusters and models having a highest overall predicted accuracy score (e.g., a highest predicted accuracy average across customer clusters).

Figure 10:
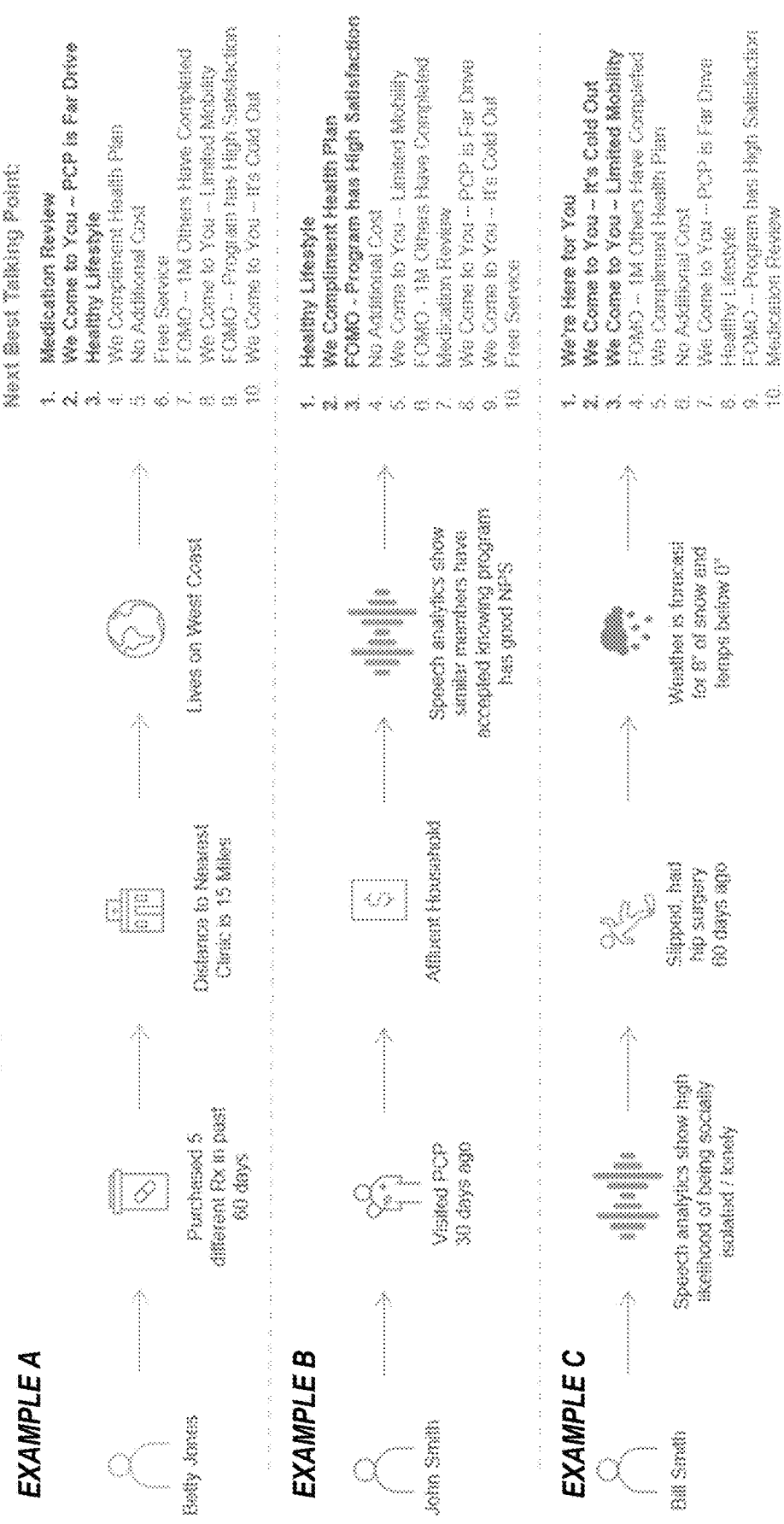
Figure 11:
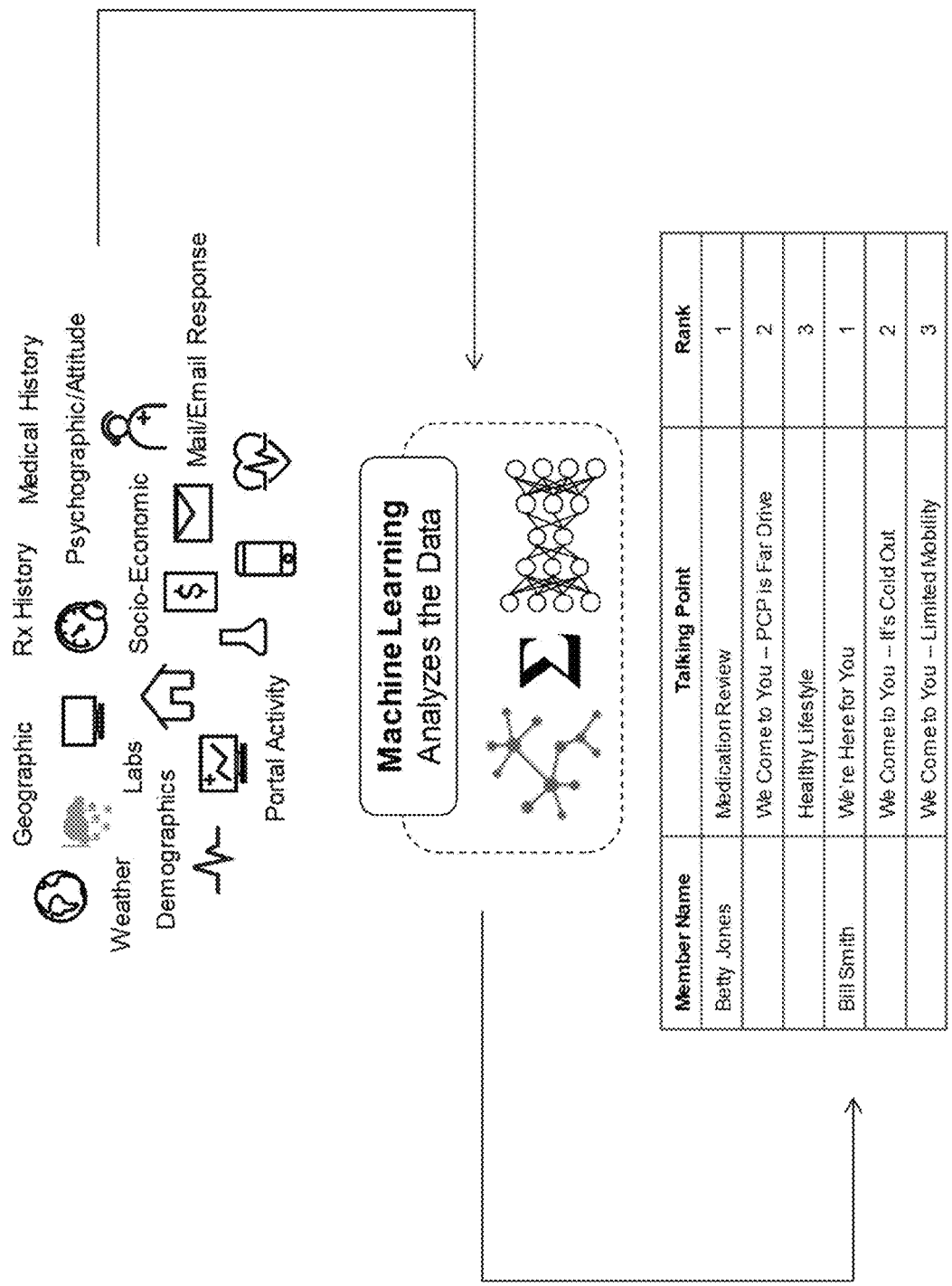

FIGS. 10-11 graphically demonstrate example processes for generating recommendations for interacting with various customers during customer-service interactions. As indicated in Example A of FIG. 10, customer Betty Jones may initiate a customer-service interaction with a customer-service representative. Based at least in part on customer-identifying data, the analytic computing entity 65 is configured to retrieve supplemental data indicating, inter alia, that Betty purchased 5 different prescriptions in the last 60 days, that she lives 15 miles away from the nearest clinic, and that she lives on the west coast of the United States. As reflected graphically in FIGS. 10-11, the recommendation model may generate a ranked listing of topics for discussion, including "Medication Review" (having a highest relevance score), "We come to you—PCP is far drive" (having a moderate relevance score), and "Healthy Lifestyle" (having a low relevance score). Other topics, such as "We compliment health plan" and "No additional cost" may have a negligible relevance score. As discussed above, the recommendation model may generate the ranked listing of topics for discussion for Betty Jones based at least in part on a determination that Betty Jones is within a cluster of customers for which parameters of the recommendation model (or the selected recommendation model itself) provides an output ranked listing as shown in FIG. 10.

Example B illustrates another example customer-interaction in which hypothetical customer John Smith initiates a customer-service interaction with a customer-service representative. Based at least in part on customer-identifying data, the analytic computing entity 65 is configured to retrieve supplemental data including, inter alia, that John visited a PCP 30 days ago, that John is a member of an affluent household, and that speech analytics show that similar customers (e.g., customers within a similar customer cluster) have accepted a given product/service with specific talking points. As reflected in FIG. 10, the recommendation model may generate a ranked listing of topics for discussion with John, including "Healthy lifestyle" (having a highest relevance score), "We complement health plan" (having a moderate relevance score), and "FOMO [Fear Of Missing Out]—the Program has High Satisfaction" (having a low relevance score). Other topics, such as "No additional cost" and "We come to you—limited mobility" may have a negligible relevance scores. As discussed above, the recommendation model may generate the ranked listing of topics for discussion for John Smith based at least in part on a determination that John Smith is within a cluster of customers for which parameters of the recommendation model (or the selected recommendation model itself) provides an output ranked listing as shown in FIG. 10.

Finally, Example C illustrates yet another example customer-interaction in which hypothetical customer Bill Smith initiates a customer-service interaction with a customer-service representative. Based at least in part on customer-identifying data, the analytic computing entity 65 is configured to retrieve supplemental data including, inter alia, that speech analytics indicates that Bill is likely socially isolated/lonely (e.g., interaction supplemental data), that Bill recently slipped and had hip surgery 60 days ago, and that the weather forecast in Bill's area calls for 8" of snow and temperatures below 0 degrees. As reflected in FIG. 10, the recommendation model may generate a ranked listing of topics for discussion with Bill, including "We're here for you" (having a highest relevance score), "We come to you—it's cold out" (having a moderate relevance score), and "We come to you—limited mobility" (having a low relevance score). Other topics, such as "FOMO—1M others have completed" and "We compliment health plan" may have negligible relevance scores. As discussed above, the recommendation model may generate the ranked listing of topics for discussion for Bill Smith based at least in part on a determination that Bill Smith is within a cluster of customers for which parameters of the recommendation model (or the selected recommendation model itself) provides an output ranked listing as shown in FIG. 10.

Figure 12:
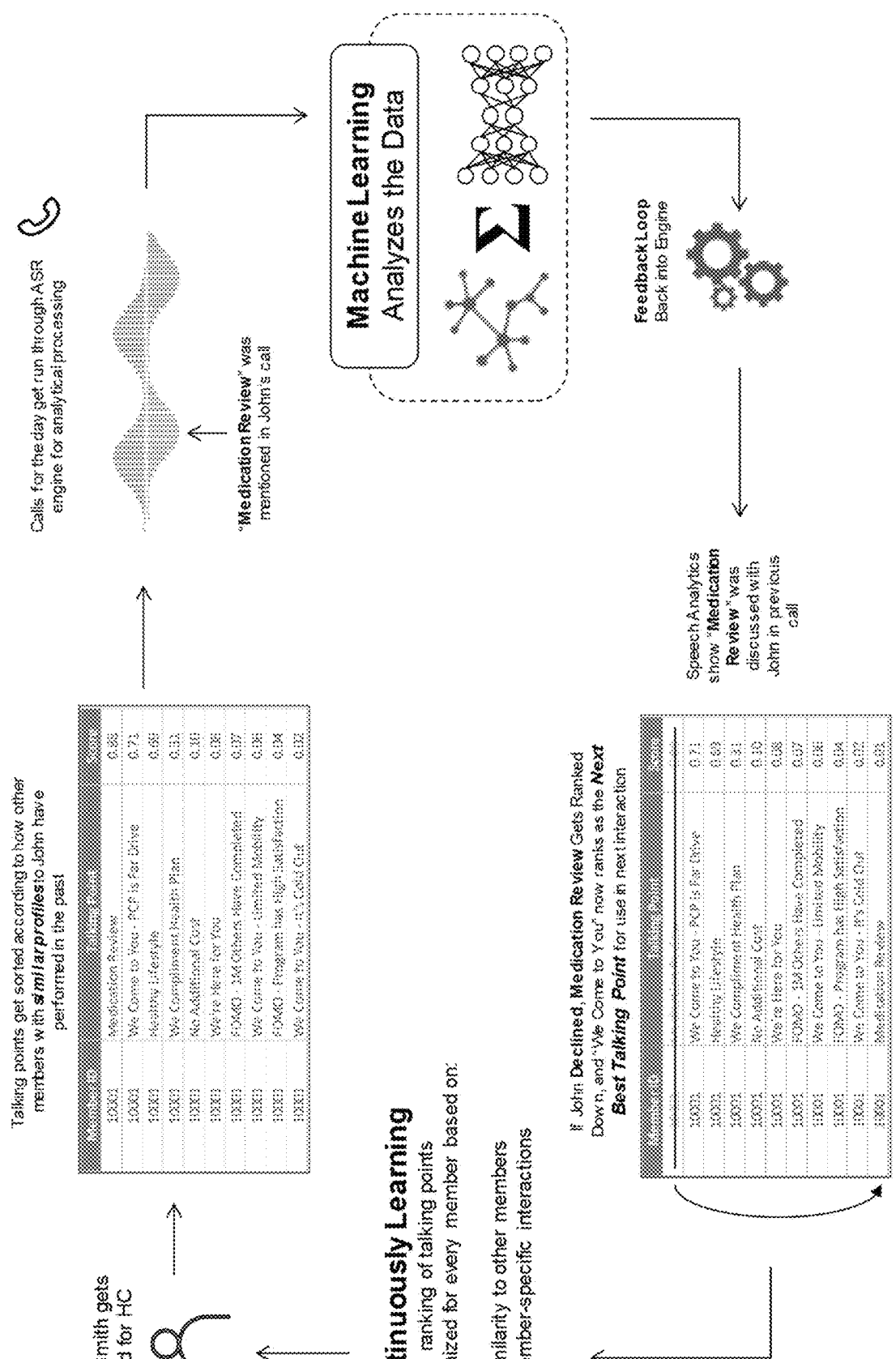
Figure 13:
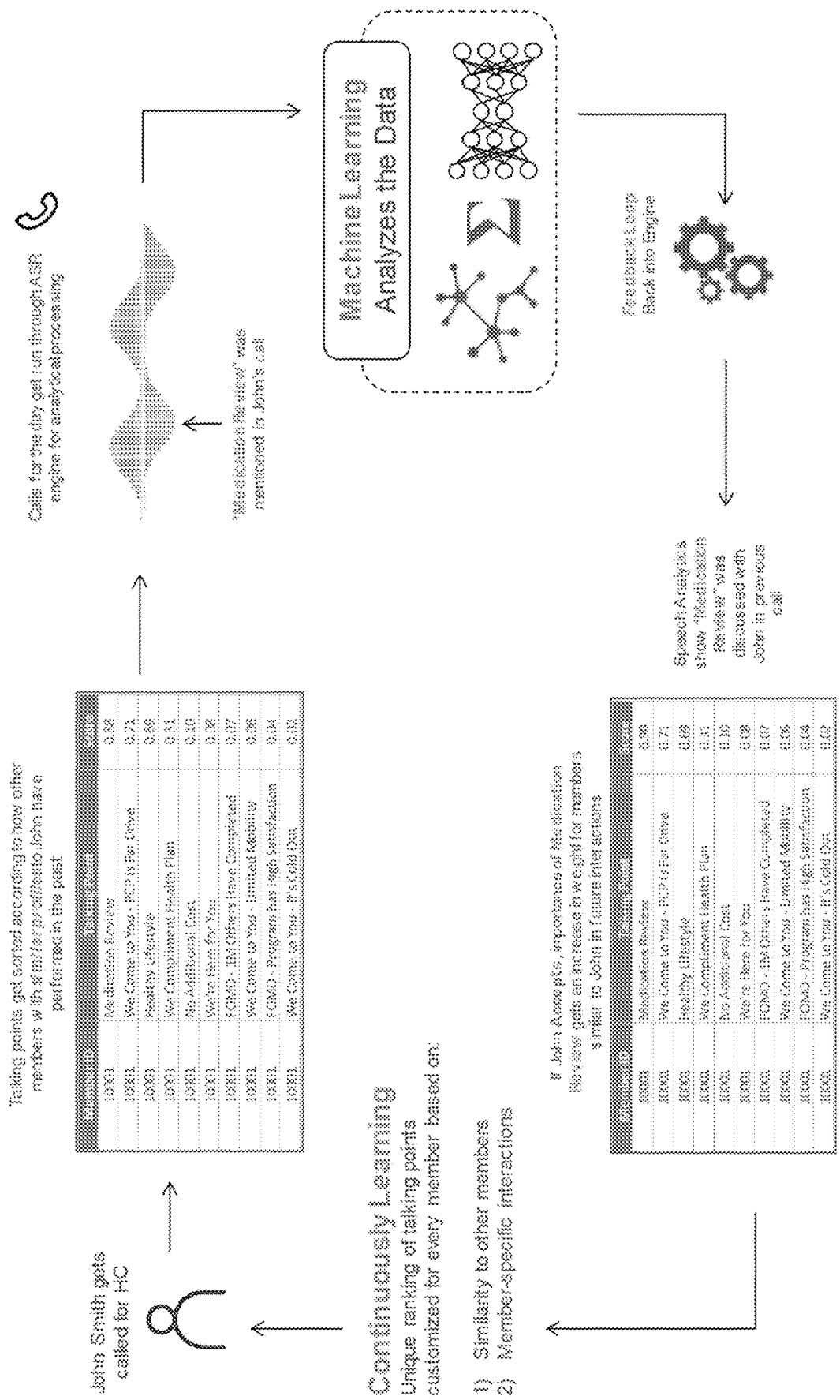

FIGS. 12-13 provide graphical examples of embodiments in which interactions with the hypothetical customer John Smith are utilized as training data for the recommendation model, and how future interactions with John Smith may be reflective of data gleaned from prior interactions with the same (or similar) customers. As indicated in both FIGS. 10-11, a first listing of recommended talking points are utilized with a first interaction with John, and that first listing of recommended talking points indicates that "Medication Review" is determined to be a most relevant topic for John Smith. After that initial interaction is complete, the interaction data is analyzed (e.g., via machine learning) to determine how that interaction influences recommendations for future interactions. As reflected in FIG. 12, if John declines the service offering, the relevance score for "Medication Review" is decreased, such that "Medication Review" is demoted for future interactions with John and/or with similar customers. However, as reflected in FIG. 13, if John accepts the service offering, the relevance score for "Medication Review" increases for future interactions with John and/or with similar customers (e.g. within similar clusters).

Figure 14:
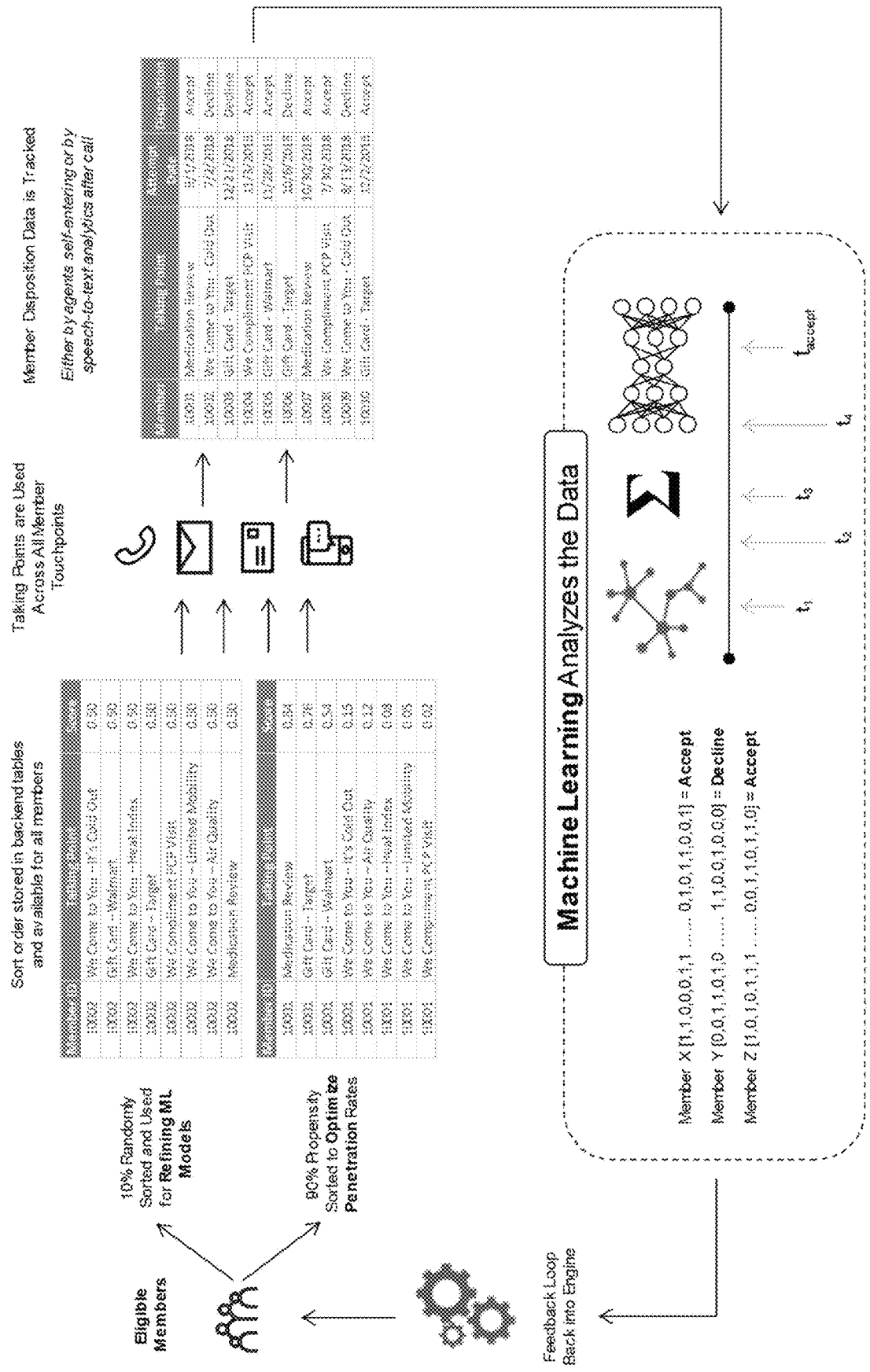

FIG. 14 graphically illustrates that learnings from interactions with a first customer may be applied to interactions with other customers determined to be within the same cluster (or otherwise determined to be similar to the first customer). As indicated in FIG. 14, optimally generated listings of topics for discussion (e.g., presented in ranked order) may be presented for a majority of customer-service interactions, however the analytic computing entity 65 may be configured to provide "recommended" talking points for a portion of customer-service interactions using a randomization algorithm (e.g., for 10% of customer-service interactions), such that non-optimal talking points may be tested periodically to determine whether other talking point orders present benefits not previously considered. The recommendations (whether through optimal recommendation modelling or randomization algorithms) may be utilized with customers via a variety of customer-service interaction types, such as telephone calls, online chats, emails, traditional mailings, and/or the like. As indicated previously, the ultimate disposition of a customer-service interaction may be monitored as a part of the interaction data, and this interaction data may be analyzed via machine learning modelling to generate appropriate recommendation models for various clusters of customers, such that future interactions may be informed with an updated recommendation model.

e. Customer-Service Representative User Interface

In certain embodiments, data indicative of recommendations for interacting with customers during customer-service interactions may be presented to customer-service representatives via one or more user interfaces (e.g., via user computing entities 30). As just one example, the user interfaces comprising data indicative of recommended talking points for a customer-service representative may be presented in a stand-alone display window (corresponding to a standalone executable software program). In other embodiments, data indicative of recommendations for interacting with customers during customer-service interactions may be provided to one or more external systems (e.g., call-center software programs, webapps for executing one or more online chats, and/or the like) to be presented as a portion of a graphical user interface screen to the customer-service representative. In various embodiments, the topics ultimately provided to the customer-service representative are selected based at least in part on the type of customer-service interaction initiated by the customer. For example, only those topics having flags corresponding to the initiated customer-service interaction type may be presented to the customer-service representative. In other embodiments, the order in which the topics for discussion are presented to the customer-service representative are selected based at least in part on the customer-service interaction type initiated by a customer.

In certain embodiments, recommendations may be presented to customer-service representatives as detailed listings of topics for discussion, presented in a recommended order in which to discuss these topics. In other embodiments, the graphical interface may present a subset of the total number of topics recommended for discussion (e.g., a single topic, representative of the recommended next topic for discussion). Moreover, at least in part because these recommendations are presented in real-time, as a customer-service representative is interacting with the customer, the recommendations may be presented as short phrases or single words to serve as reminders to the customer-service representative of topics for discussion.

VI. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
storing, by at least one processor and in a non-transitory memory, talking point data identifying a plurality of topical keywords each associated with a talking point identified at least in part by an interaction analysis performed for a plurality of historical customer-service interactions;
receiving, by the at least one processor and as a part of a customer-service interaction initiated by a customer and between the customer and a customer-service representative, customer identifying data uniquely identifying the customer;
receiving, by the at least one processor and based at least in part on the customer identifying data, supplemental data for the customer;
identifying, by the at least one processor executing a customer-similarity model and based at least in part on the supplemental data for the customer, one or more recommendation model parameters for the customer, wherein the one or more recommendation model parameters are identified for a first customer cluster identified by the customer-similarity model and wherein the first customer cluster comprises the customer; and
identifying, by the at least one processor executing a recommendation model comprising the one or more recommendation model parameters for the customer, an ordered listing of talking points comprising a plurality of topical keywords selected from the talking point data; and providing at least a portion of the ordered listing of talking points for display to the customer-service representative via a graphical user interface.

2. The computer-implemented method of claim 1, wherein identifying the one or more recommendation model parameters comprises identifying a recommendation model for the first customer cluster.

3. The computer-implemented method of claim 1, wherein at least a portion of the supplemental data is specific to the customer-service interaction.

4. The computer-implemented method of claim 1, wherein identifying the one or more recommendation model parameters comprises:
   executing the customer-similarity model based at least in part on supplemental data associated with a plurality of customers to identify a plurality of customer clusters, wherein each customer cluster of the plurality of customer clusters comprises a plurality of customers determined to be similar based at least in part on the customer-similarity model, and wherein the plurality of customer clusters comprises the first customer cluster; and
   training a recommendation model for the first customer cluster to identify the recommendation model parameters based at least in part on interaction data comprising data indicative of results of historical customer-service interactions with customers associated with the first customer cluster.

5. The computer-implemented method of claim 4, wherein the interaction data for each historical customer-service interaction comprises data identifying keywords mentioned during a historical customer-service interaction and timestamps associated with each keyword mentioned during the historical customer-service interaction.

6. The computer-implemented method of claim 5, wherein the keywords mentioned during the historical customer-service interaction comprise topical keywords and reactive keywords each indicative of a customer's reaction.

7. The computer-implemented method of claim 1, further comprising:
   identifying, during the customer-service interaction initiated by the customer, additional supplemental data for the customer;
   identifying, by the processor executing the customer-similarity model, one or more updated recommendation model parameters for the customer based at least in part on the additional supplemental data; and
   identifying, by the processor executing the recommendation model comprising the one or more updated recommendation model parameters for the customer, an updated ordered listing of talking points comprising a plurality of topical keywords selected from the talking point data.

8. A computing system comprising a non-transitory computer readable storage medium and one or more processors, the one or more processors configured to:
   store, in the non-transitory computer readable storage medium, talking point data identifying a plurality of topical keywords each associated with a talking point identified at least in part by an interaction analysis performed for a plurality of historical customer-service interactions;
   receive, via the one or more processors as a part of a customer-service interaction initiated by a customer between the customer and a customer-service representative, customer identifying data uniquely identifying the customer;
   receive, based at least in part on the customer identifying data, supplemental data for the customer;
   identify, by executing a customer-similarity model, one or more recommendation model parameters for the customer, wherein the one or more recommendation model parameters are identified for a first customer cluster identified by the customer-similarity model and wherein the first customer cluster comprises the customer; and
   identify, by executing a recommendation model comprising the one or more recommendation model parameters for the customer, an ordered listing of talking points comprising a plurality of topical keywords selected from the talking point data; and
   provide at least a portion of the ordered listing of talking points for display to a customer-service representative via a graphical user interface.

9. The computing system of claim 8, wherein identifying the one or more recommendation model parameters comprises identifying a recommendation model for the first customer cluster.

10. The computing system of claim 8, wherein at least a portion of the supplemental data is specific to the customer-service interaction.

11. The computing system of claim 8, wherein identifying the one or more recommendation model parameters comprises:
    executing the customer-similarity model based at least in part on supplemental data associated with a plurality of customers to identify a plurality of customer clusters, wherein each customer cluster of the plurality of customer clusters comprises a plurality of customers determined to be similar based at least in part on the customer-similarity model, and wherein the plurality of customer clusters comprises the first customer cluster; and
    training a recommendation model for the first customer cluster to identify the recommendation model parameters based at least in part on interaction data comprising data indicative of results of historical customer-service interactions with customers associated with the first customer cluster.

12. The computing system of claim 11, wherein the interaction data for each historical customer-service interaction comprises data identifying keywords mentioned during a historical customer-service interaction and timestamps associated with each keyword mentioned during the historical customer-service interaction.

13. The computing system of claim 12, wherein the keywords mentioned during the historical customer-service interaction comprise topical keywords and reactive keywords each indicative of a customer's reaction.

14. The computing system of claim 8, wherein the one or more processors are further configured to:
    identify, during the customer-service interaction initiated by the customer, additional supplemental data for the customer;
    identify, by executing the customer-similarity model, one or more updated recommendation model parameters for the customer based at least in part on the additional supplemental data; and
    identify, by via the one or more processors executing the recommendation model comprising the one or more updated recommendation model parameters for the customer, an updated ordered listing of talking points comprising a plurality of topical keywords selected from the talking point data.

15. A computer program product comprising a non-transitory computer readable medium having computer program instructions stored therein, the computer program instructions when executed by one or more processors, cause the one or more processors to:
- store, in non-transitory memory, talking point data identifying a plurality of topical keywords each associated with a talking point identified at least in part by an interaction analysis performed for a plurality of historical customer-service interactions;
- receive, as a part of a customer-service interaction initiated by a customer between the customer and a customer-service representative, customer identifying data uniquely identifying the customer;
- receive, based at least in part on the customer identifying data, supplemental data for the customer;
- identify, at least in part by execution of a customer-similarity model, one or more recommendation model parameters for the customer, wherein the one or more recommendation model parameters are identified for a first customer cluster identified by the customer-similarity model and wherein the first customer cluster comprises the customer; and
- identify, at least in part by execution of a recommendation model comprising the one or more recommendation model parameters for the customer, an ordered listing of talking points comprising a plurality of topical keywords selected from the talking point data; and
- provide at least a portion of the ordered listing of talking points for display to a customer-service representative via a graphical user interface.

16. The computer program product of claim 15, wherein identifying the one or more recommendation model parameters comprises identifying a recommendation model for the first customer cluster.

17. The computer program product of claim 15, wherein at least a portion of the supplemental data is specific to the customer-service interaction.

18. The computer program product of claim 15, wherein identifying the one or more recommendation model parameters comprises:
- executing the customer-similarity model based at least in part on supplemental data associated with a plurality of customers to identify a plurality of customer clusters, wherein each customer cluster of the plurality of customer clusters comprises a plurality of customers determined to be similar based at least in part on the customer-similarity model, and wherein the plurality of customer clusters comprises the first customer cluster; and
- training a recommendation model for the first customer cluster to identify the recommendation model parameters based at least in part on interaction data comprising data indicative of results of historical customer-service interactions with customers associated with the first customer cluster.

19. The computer program product of claim 18, wherein the interaction data for each historical customer-service interaction comprises data identifying keywords mentioned during a historical customer-service interaction and timestamps associated with each keyword mentioned during the historical customer-service interaction.

20. The computer program product of claim 19, wherein the keywords mentioned during the historical customer-service interaction comprise topical keywords and reactive keywords each indicative of a customer's reaction.

21. The computer program product of claim 15, the computer program instructions when executed by the one or more processors, further cause the one or more processors to:
- identify, during the customer-service interaction initiated by the customer, additional supplemental data for the customer;
- identify, by executing the customer-similarity model, one or more updated recommendation model parameters for the customer based at least in part on the additional supplemental data; and
- identify, by executing the recommendation model comprising the one or more updated recommendation model parameters for the customer, an updated ordered listing of talking points comprising a plurality of topical keywords selected from the talking point data.

* * * * *

UNITED STATES PATENT AND TRADEMARK OFFICE
CERTIFICATE OF CORRECTION

| | | |
|---|---|---|
| PATENT NO. | : 11,663,607 B2 | Page 1 of 1 |
| APPLICATION NO. | : 16/656261 | |
| DATED | : May 30, 2023 | |
| INVENTOR(S) | : David Billigmeier et al. | |

It is certified that error appears in the above-identified patent and that said Letters Patent is hereby corrected as shown below:

In the Claims

In Column 30, Line 47, Claim 1, delete "and between" and insert -- between --, therefor.

In Column 32, Line 62, Claim 14, delete "by via the one or more processors" and insert -- by --, therefor.

Signed and Sealed this
Fifth Day of September, 2023

Katherine Kelly Vidal
*Director of the United States Patent and Trademark Office*